United States Patent  (10) Patent No.: US 10,735,722 B2
Zhao et al.                                  (45) Date of Patent:     Aug. 4, 2020

(54) INTRA PREDICTION WITH WIDE ANGLE MODE IN VIDEO CODING

(71) Applicant: Tencent America LLC, Palo Alto, CA (US)

(72) Inventors: Liang Zhao, Sunnyvale, CA (US); Shan Liu, San Jose, CA (US); Xin Zhao, San Diego, CA (US); Xiang Li, Los Gatos, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 16/443,231

(22) Filed: Jun. 17, 2019

(65) Prior Publication Data

US 2020/0021799 A1    Jan. 16, 2020

Related U.S. Application Data

(63) Continuation of application No. 16/147,122, filed on Sep. 28, 2018, now Pat. No. 10,404,980.
(Continued)

(51) Int. Cl.
*H04N 19/70* (2014.01)
*H04N 19/105* (2014.01)
*H04N 19/176* (2014.01)
*H04N 19/159* (2014.01)
*H04N 19/593* (2014.01)

(52) U.S. Cl.
CPC ......... *H04N 19/105* (2014.11); *H04N 19/159* (2014.11); *H04N 19/176* (2014.11); *H04N 19/593* (2014.11)

(58) Field of Classification Search
CPC ... H04N 19/105; H04N 19/176; H04N 19/159
See application file for complete search history.

(56) References Cited

U.S. PATENT DOCUMENTS 8,526,495 B2   9/2013   Liu et al.
9,049,452 B2   6/2015   Liu et al.
(Continued)

OTHER PUBLICATIONS

High Efficiency Video Coding, Rec. ITU-T H.265 v4 Dec. 2016.
(Continued)

*Primary Examiner* — Howard D Brown, Jr.
(74) *Attorney, Agent, or Firm* — Oblon, McClelland, Maier & Neustadt, L.L.P.

(57) ABSTRACT

Aspects of the disclosure provide an apparatus for video coding. The apparatus includes circuitry configured to reconstruct one or more blocks neighboring a first block that is non-square, and determine a range of reference samples required for an intra prediction of the first block based on a shape of the first block. The range includes samples having coordinates of $x=[-1]$, $y=[-1$ to $(dimension1*2+m)]$, and $x=[0$ to $(dimension2*2+n)]$, $y=[-1]$. Dimension1 denotes a length of a first side of the first block, dimension2 denotes a length of a second side of the first block that is perpendicular to the first side of the first block, and m and n are integers greater or equal to 0. The circuitry is further configured to perform the intra prediction based on the reference samples in the determined range.

20 Claims, 22 Drawing Sheets

Related U.S. Application Data

(60) Provisional application No. 62/698,526, filed on Jul. 16, 2018, provisional application No. 62/696,212, filed on Jul. 10, 2018.

(56) References Cited

U.S. PATENT DOCUMENTS

| | | | |
|---|---|---|---|
| 9,363,511 B2 | 6/2016 | Zhang et al. | |
| 9,510,012 B2 | 11/2016 | Liu et al. | |
| 9,769,472 B2 | 9/2017 | Liu et al. | |
| 9,813,726 B2 | 11/2017 | Liu et al. | |
| 2013/0136184 A1* | 5/2013 | Suzuki | H04N 19/159 375/240.16 |
| 2014/0168362 A1* | 6/2014 | Hannuksela | H04N 19/597 348/43 |
| 2016/0057430 A1* | 2/2016 | Kolesnikov | H04N 19/159 375/240.12 |
| 2016/0309153 A1* | 10/2016 | Merkle | H04N 19/176 |
| 2017/0118486 A1* | 4/2017 | Rusanovskyy | H04N 19/176 |
| 2017/0272745 A1 | 9/2017 | Lie et al. | |
| 2017/0353730 A1 | 12/2017 | Liu et al. | |
| 2018/0332312 A1* | 11/2018 | Liu | H04N 19/96 |
| 2018/0341278 A1* | 11/2018 | Zhang | G06T 7/74 |
| 2018/0352222 A1* | 12/2018 | Liu | H04N 19/105 |

OTHER PUBLICATIONS

Rickard Sjöberg et. al, "Description of SDR and HDR video coding technology proposal by Ericsson and Nokia", JVET-J0012, Joint Video Exploration Team (JVET) of ITU-T SG 16 WP 3 and ISO/IEC JTC 1/SC 29/WG 11, 10th Meeting: San Diego, CA, USA, Apr. 10-12, 2018.

X. Zhang, et al, "Intra mode coding in HEVC standard", Visual Communications and Image Processing (VCIP), 2012 IEEE.

S. Liu; X. Zhang; S. Lei, "Rectangular partitioning for Intra prediction in HEVC", Visual Communications and Image Processing (VCIP), IEEE, Jan. 2012.

X. Zhang, et al, "Non-CE6: Intra mode coding with fixed length binarization", Joint Collaborative Team on Video Coding (JCT-VC) of ITU-T SG16 WP3 and ISO/IEC JTC1/SC29/WG11, 8th Meeting, JCTVC-H0435, pp. 1-5.

S. Liu, X. Zhang, S. Lei, "Rectangular (2N×N and N×2N) Intra Prediction", JCTVC-G0135, Joint Collaborative Team on Video Coding (JCTVC), of ITU-T SG 16 WP 3 and ISO/IEC JTC 1/SC 29/WG 11, Geneva, Nov. 2011.

* cited by examiner

| Condition | Replaced intra prediction modes |
|---|---|
| W / H == 2 | Modes 2, 3, 4 |
| W / H > 2 | Modes 2, 3, 4, 5, 6 |
| W / H == 1 | None |
| H / W == 1/2 | Modes 32, 33, 34 |
| H / W < 1/2 | Modes 30, 31, 32, 33, 34 |

*FIG. 13*

| Condition | Replaced intra prediction modes |
|---|---|
| W / H == 2 | Modes 2,3,4,5,6,7 |
| W / H > 2 | Modes 2,3,4,5,6,7,8,9,10,11 |
| W / H == 1 | None |
| H / W == 1/2 | Modes 61,62,63,64,65,66 |
| H / W < 1/2 | Mode 57,58,59,60,61,62,63,64,65,66 |

*FIG. 14*

| Condition | Replaced intra prediction modes |
|---|---|
| W / H == 32 | Modes 2, 3, 4, 5, 6, 7, 8, 9 |
| W / H == 16 | Modes 2, 3, 4, 5, 6, 7, 8 |
| W / H == 8 | Modes 2, 3, 4, 5, 6, 7, 8 |
| W / H == 4 | Modes 2, 3, 4, 5, 6, 7 |
| W / H == 2 | Modes 2, 3, 4, 5 |
| W / H == 1 | None |
| H / W == 1/2 | Modes 31, 32, 33, 34 |
| H / W == 1/4 | Modes 29, 30, 31, 32, 33, 34 |
| H / W == 1/8 | Modes 28, 29, 30, 31, 32, 33, 34 |
| H / W == 1/16 | Modes 28, 29, 30, 31, 32, 33, 34 |
| H / W == 1/32 | Modes 27, 28, 29, 30, 31, 32, 33, 34 |

| Condition | Replaced intra prediction modes |
|---|---|
| W / H == 32 | Modes 2, 3, 4, 5, 6, 7, 8, 9, 10, 11, 12, 13, 14, 15, 16, 17 |
| W / H == 16 | Modes 2, 3, 4, 5, 6, 7, 8, 9, 10, 11, 12, 13, 14, 15 |
| W / H == 8 | Modes 2, 3, 4, 5, 6, 7, 8, 9, 10, 11, 12, 13, 14, 15 |
| W / H == 4 | Modes 2, 3, 4, 5, 6, 7, 8, 9, 10, 11, 12, 13 |
| W / H == 2 | Modes 2, 3, 4, 5, 6, 7, 8, 9 |
| W / H == 1 | None |
| H / W == 1/2 | Modes 59, 60, 61, 62, 63, 64, 65, 66 |
| H / W == 1/4 | Modes 55, 56, 57, 58, 59, 60, 61, 62, 63, 64, 65, 66 |
| H / W == 1/8 | Modes 53, 54, 55, 56, 57, 58, 59, 60, 61, 62, 63, 64, 65, 66 |
| H / W == 1/16 | Modes 53, 54, 55, 56, 57, 58, 59, 60, 61, 62, 63, 64, 65, 66 |
| H / W == 1/32 | Modes 51, 52 53, 54, 55, 56, 57, 58, 59, 60, 61, 62, 63, 64, 65, 66 |

*Specification of intraPredAngle*

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | - | 32 | 26 | 20 | 16 | 12 | 8 | 4 | 2 | 0 | -2 | -4 | -8 | -12 | -16 | -20 | -26 |
| predModeIntra | 18 | 19 | 20 | 21 | 22 | 23 | 24 | 25 | 26 | 27 | 28 | 29 | 30 | 31 | 32 | 33 | 34 |
| intraPredAngle | -32 | -26 | -20 | -16 | -12 | -8 | -4 | -2 | 0 | 2 | 4 | 8 | 12 | 16 | 20 | 26 | 32 |

*Specification of invAngle*

| predModeIntra | 11 | 12 | 13 | 14 | 15 | 16 | 17 | 18 |
|---|---|---|---|---|---|---|---|---|
| invAngle | -4096 | -2048 | -1024 | -683 | -512 | -410 | -315 | -256 |
| predModeIntra | 19 | 20 | 21 | 22 | 23 | 24 | 25 | 26 |
| invAngle | -315 | -410 | -512 | -683 | -1024 | -2048 | -4096 | - |

FIG. 23

*Specification of intraPredAngle*

| predModeIntra | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| intraPredAngle | - | 32 | 29 | 26 | 23 | 20 | 18 | 16 | 14 | 12 | 10 | 8 | 6 | 4 | 3 | 2 | 1 |
| predModeIntra | 18 | 19 | 20 | 21 | 22 | 23 | 24 | 25 | 26 | 27 | 28 | 29 | 30 | 31 | 32 | 33 | 34 |
| intraPredAngle | 0 | -1 | -2 | -3 | -4 | -6 | -8 | -10 | -12 | -14 | -16 | -18 | -20 | -23 | -26 | -29 | -32 |
| predModeIntra | 35 | 36 | 37 | 38 | 39 | 40 | 41 | 42 | 43 | 44 | 45 | 46 | 47 | 48 | 49 | 50 | 51 |
| intraPredAngle | -29 | -26 | -23 | -20 | -18 | -16 | -14 | -12 | -10 | -8 | -6 | -4 | -3 | -2 | -1 | 0 | 1 |
| predModeIntra | 52 | 53 | 54 | 55 | 56 | 57 | 58 | 59 | 60 | 61 | 62 | 63 | 64 | 65 | 66 | | |
| intraPredAngle | 2 | 3 | 4 | 6 | 8 | 10 | 12 | 14 | 16 | 18 | 20 | 23 | 26 | 29 | 32 | | |

FIG. 24

INTRA PREDICTION WITH WIDE ANGLE MODE IN VIDEO CODING

INCORPORATION BY REFERENCE

This application is a continuation of U.S. Ser. No. 16/147,122 filed Sep. 28, 2018, which claims the benefit of priority to U.S. Provisional Application No. 62/696,212, "Reference Sample Padding and Filtering for Intra Prediction in Video Compression" filed on Jul. 10, 2018, and U.S. Provisional Application No. 62/698,526, "Reference Sample Padding and Filtering for Intra Prediction in Video Compression" filed on Jul. 16, 2018, the entire contents of which are incorporated by reference herein in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding using inter-picture prediction with motion compensation has been known for decades. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GByte of storage space.

One purpose of video coding and decoding can be the reduction of redundancy in the input video signal, through compression. Compression can help reduce aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between the original and reconstructed signal is small enough to make the reconstructed signal useful for the intended application. In the case of video, lossy compression is widely employed. The amount of distortion tolerated depends on the application; for example, users of certain consumer streaming applications may tolerate higher distortion than users of television contribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding, some of which will be introduced below.

Video codec technologies can include techniques known as intra coding. In Intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as Independent Decoder Refresh Pictures, can be used to reset the decoder state and can, therefore, be used in as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer bits are required at a given quantization step size to represent the block after entropy coding.

Traditional intra coding such as known from, for example MPEG-2 generation coding technologies does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/sub-mode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as those known as JEM/VVC/BMS. A predictor block can be formed using neighboring samples values belonging to already available samples. Sample values of neighboring samples are copied into the predictor block according to a direction in some examples. A reference to the direction in use can be coded in the bitstream or may itself be predicted.

Referring to FIG. 1, depicted in the lower right are a set of eight predictor directions known from H.265's 35 possible predictor directions. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1, on the top left there is depicted a square block (104) of 4×4 samples (indicated by a dashed, boldface line). A two-dimensional coordinate system is used to identify samples in FIG. 1 with the sample at the top left of block (104) as an original point. The square block (104) consists of 16 samples, each labelled with an "S", its position in X dimension and its position in Y dimension. For example, sample S10 is the second sample in the X dimension (from the left) and the first (topmost) sample in the Y dimension. Similarly, sample S33 is the fourth sample in block (104) in both the X and Y dimension. As the block is 4×4 samples in size, S33 is at the bottom right. Further shown are reference samples that follow a similar numbering scheme. A reference sample is labelled with an "R", its X position and Y position relative to S00.

In both H.264 and H.265, reference samples for intra prediction are from adjacent reconstructed blocks, and neighbor the block under reconstruction.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from prediction sample or samples to the upper right, at a 45 degree angle from the horizontal. In that case, samples S30, S21, S12, and S03 are predicted from same R(4, −1). Sample S33 is predicted from R(7, −1) (arrow 105).

In certain cases, the values of multiple reference samples may be combined, for example through interpolation, in order to calculate a reference sample; especially when the directions are not evenly divisible by 45 degrees.

The number of possible directions has increased as video coding technology developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

The mapping of intra prediction directions bits in the coded video bitstream that represent the direction can be different from video coding technology to video coding technology; and can range, for example, from simple direct mappings of prediction direction to intra prediction mode to codewords, to complex adaptive schemes involving most probably modes and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

SUMMARY

Aspects of the disclosure provide method and apparatus for video coding. In an embodiment, an apparatus for video coding includes circuitry configured to reconstruct one or more blocks neighboring a first block that is rectangular but non-square. The circuitry is further configured to determine a range of reference samples required for an intra prediction of the first block based on a shape of the first block. The range includes samples having coordinates of x=[−1], y=[−1 to (dimension1*2+m)], and x=[0 to (dimension2*2+n)], y=[−1]. Dimension1 denotes a length of a first side of the first block, dimension2 denotes a length of a second side of the first block that is perpendicular to the first side of the first block, and m and n are integers greater or equal to 0. The circuitry is further configured to perform the intra prediction of the first block based on the reference samples in the determined range.

Aspects of the disclosure also provide a non-transitory computer-readable medium storing instructions which when executed by a computer for video decoding cause the computer to perform the method for video coding.

BRIEF DESCRIPTION OF THE DRAWINGS

Further features, the nature, and various advantages of the disclosed subject matter will be more apparent from the following detailed description and the accompanying drawings in which:

FIG. 13 shows a table of intra predication modes replaced by wide angular modes when 35 intra prediction modes are used according to an embodiment of the disclosure.

FIG. 14 shows a table of intra predication modes replaced by wide angular modes when 67 intra prediction modes are used according to an embodiment of the disclosure.

FIG. 23 shows a modified angle table in case of 35 intra prediction modes according to an embodiment of the disclosure.

FIG. 24 shows a modified angle table in case of 67 intra prediction modes according to an embodiment of the disclosure.

DETAILED DESCRIPTION OF EMBODIMENTS

Figure 1:
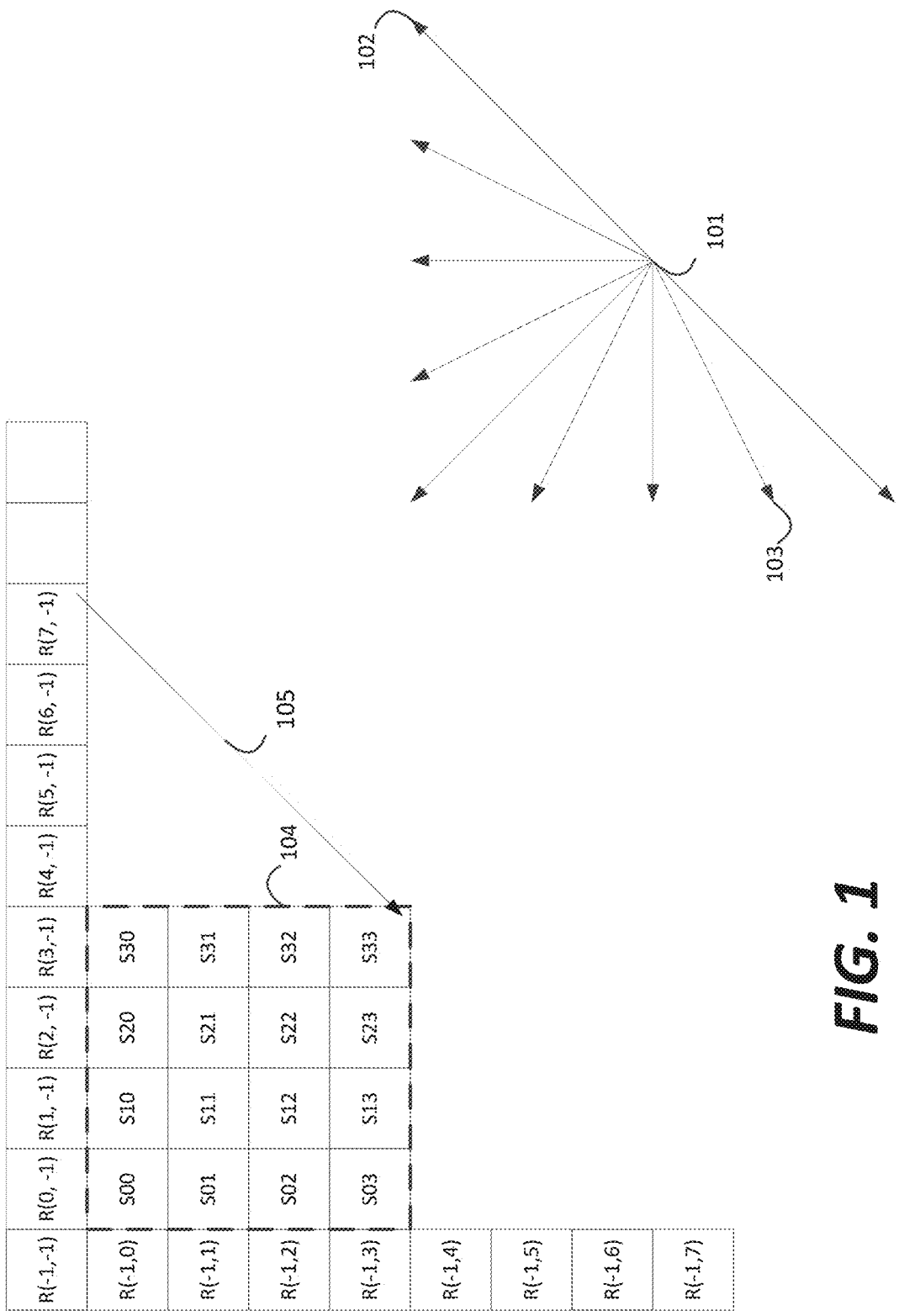
FIG. 1 is a schematic illustration of a subset of intra prediction modes in accordance with H.265.
Figure 2:
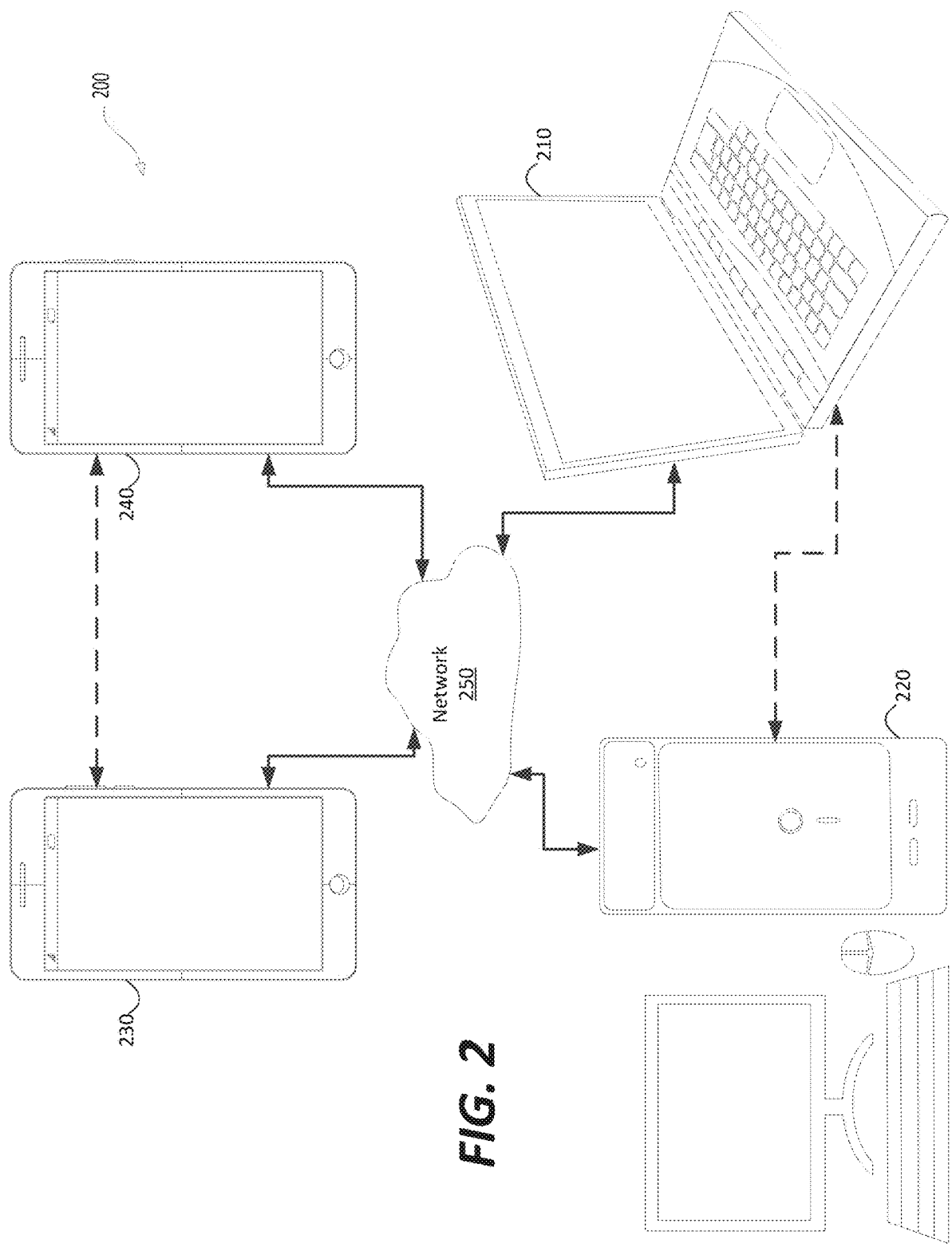
FIG. 2 is a schematic illustration of a simplified block diagram of a communication system in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers and smart phones but the principles of the present disclosure may be not so limited. Embodiments of the present disclosure find application with laptop computers, tablet computers, media players and/or dedicated video conferencing equipment. The network (250) represents any number of networks that convey coded video data among the terminal devices (210), (220), (230) and (240), including for example wireline (wired) and/or wireless communication networks. The communication network (250) may exchange data in circuit-switched and/or packet-switched channels. Representative networks include telecommunications networks, local area networks, wide area networks and/or the Internet. For the purposes of the present discussion, the architecture and topology of the network (250) may be immaterial to the operation of the present disclosure unless explained herein below.

Figure 3:
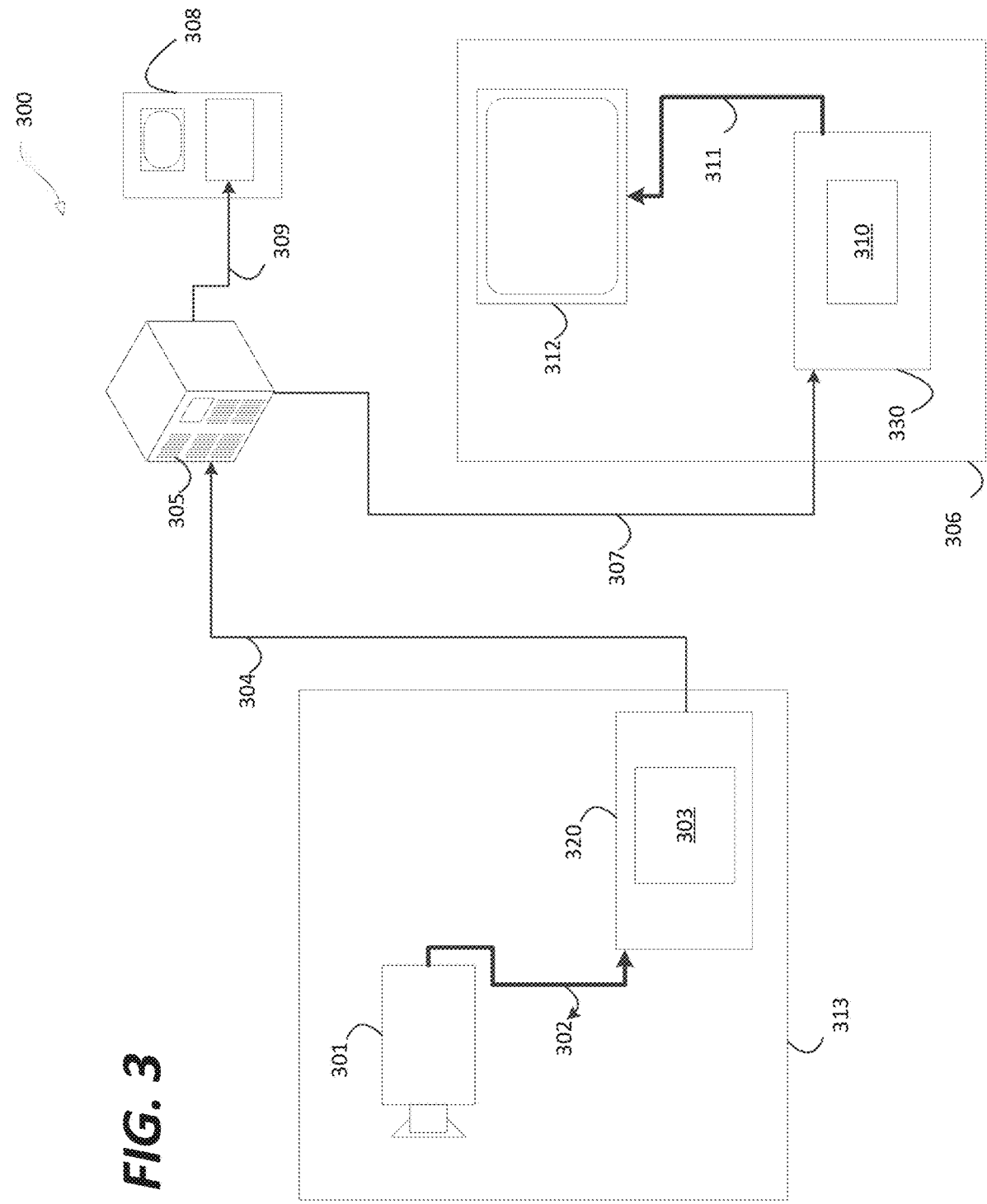
FIG. 3 is a schematic illustration of a simplified block diagram of a communication system in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding or VVC. The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
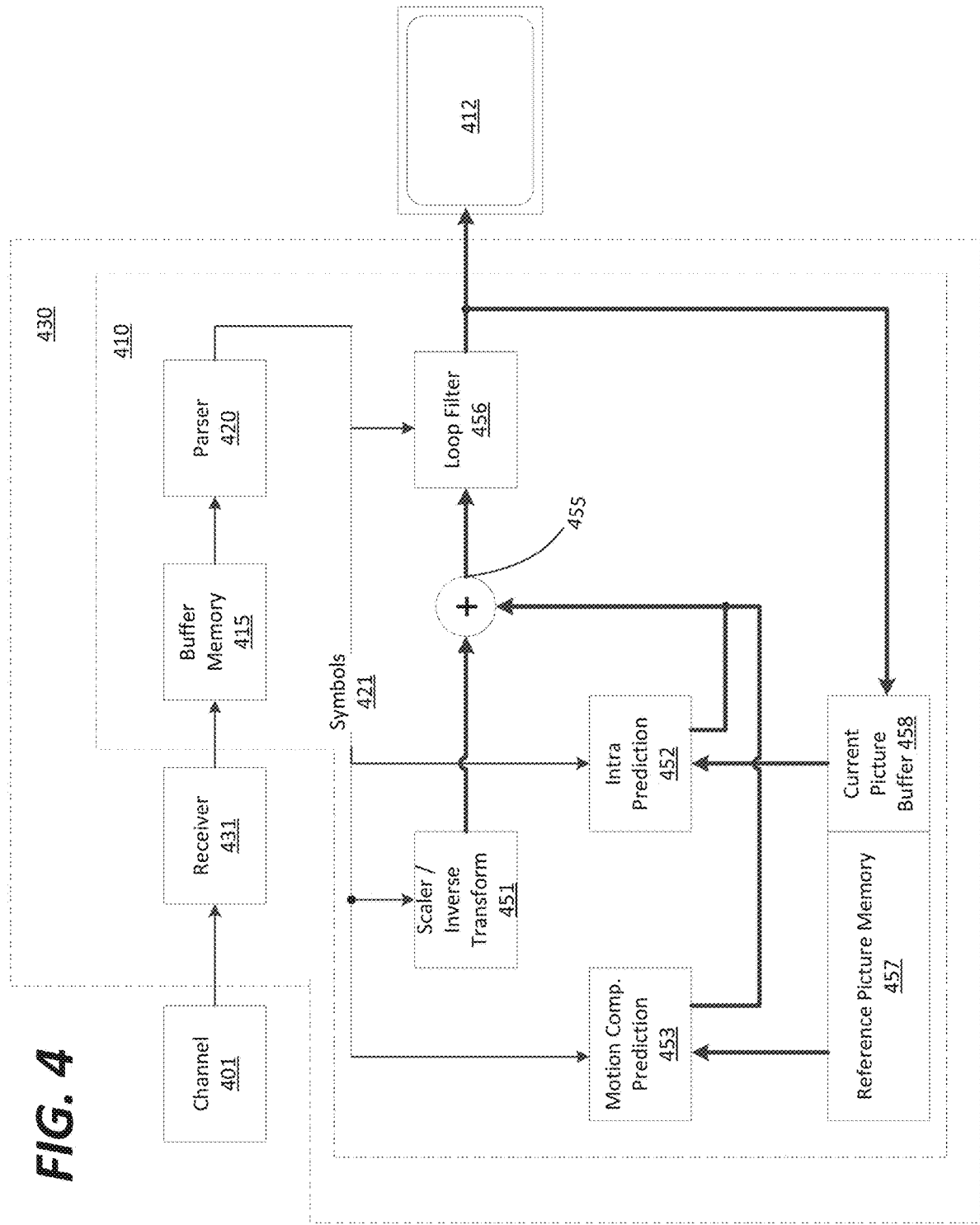
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplementary Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (420) may also extract from the coded video sequence information such as transform coefficients, quantizer parameter values, motion vectors, and so forth.

The parser (420) may perform entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as document in the video compression technology or standard. Specifically, a profile can select a certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
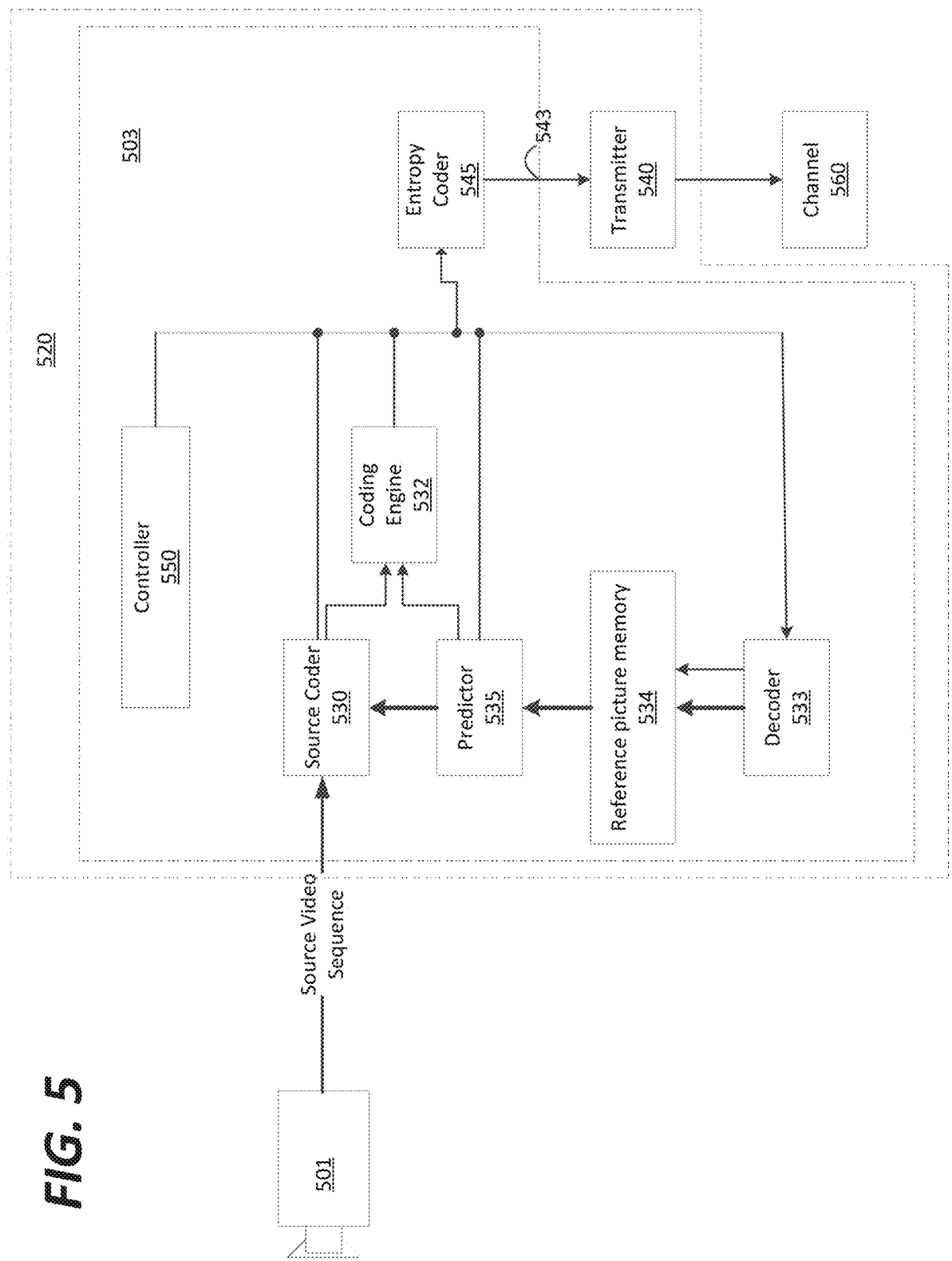
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501)(that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ) and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focusses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies known to a person skilled in the art as, for example Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of Intra pictures, including, for example Independent Decoder Refresh ("IDR") Pictures. A person skilled in the art is aware of those variants of I pictures and their respective applications and features.

A Predictive picture (P picture) may be one that may be coded and decoded using intra prediction or inter prediction using at most one motion vector and reference index to predict the sample values of each block.

A Bi-directionally Predictive Picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded predictively or they may be coded predictively with reference to already coded blocks of the same picture (spatial prediction or intra prediction). Pixel blocks of P pictures may be coded predictively, via spatial prediction or via temporal prediction with reference to one previously coded reference pictures. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, Supplementary Enhancement Information (SEI) messages, Visual Usability Information (VUI) parameter set fragments, and so on.

A video may be captured as a plurality of source pictures (video pictures) in a temporal sequence. Intra-picture prediction (often abbreviated to Intra prediction) makes uses of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels and the like.

Figure 6:
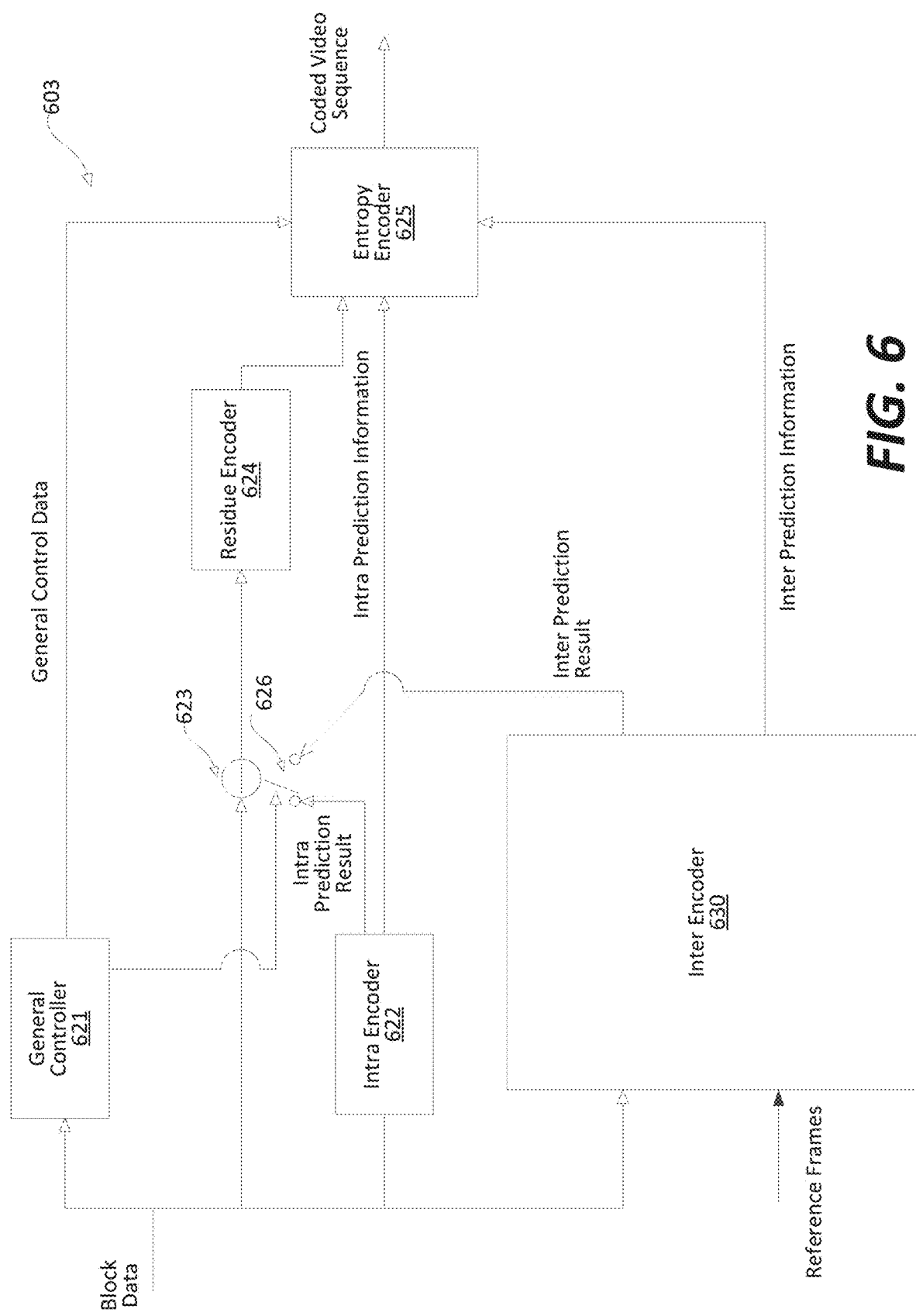
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621) and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique.

The intra encoder (622) is configured to receive the samples of the current block (e.g., a processing block), in some cases compare the block to blocks already coded in the same picture, generate quantized coefficients after transform and, in some cases also intra prediction information (e.g., an intra prediction direction information according to one or more intra encoding techniques).

The general controller (621) is configured to determine general control data and control other components of the video encoder (603) based on the general control data. In an example, the general controller (621) determines the mode of the block, and provides a control signal to the switch (626) based on the mode. For example, when the mode is the intra, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data in the frequency domain, and generate the transform coefficients. The transform coefficients are then subject to quantization processing to obtain quantized transform coefficients.

The entropy encoder (625) is configured to format the bitstream to include the encoded block. The entropy encoder (625) is configured to include various information according to a suitable standard, such as HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
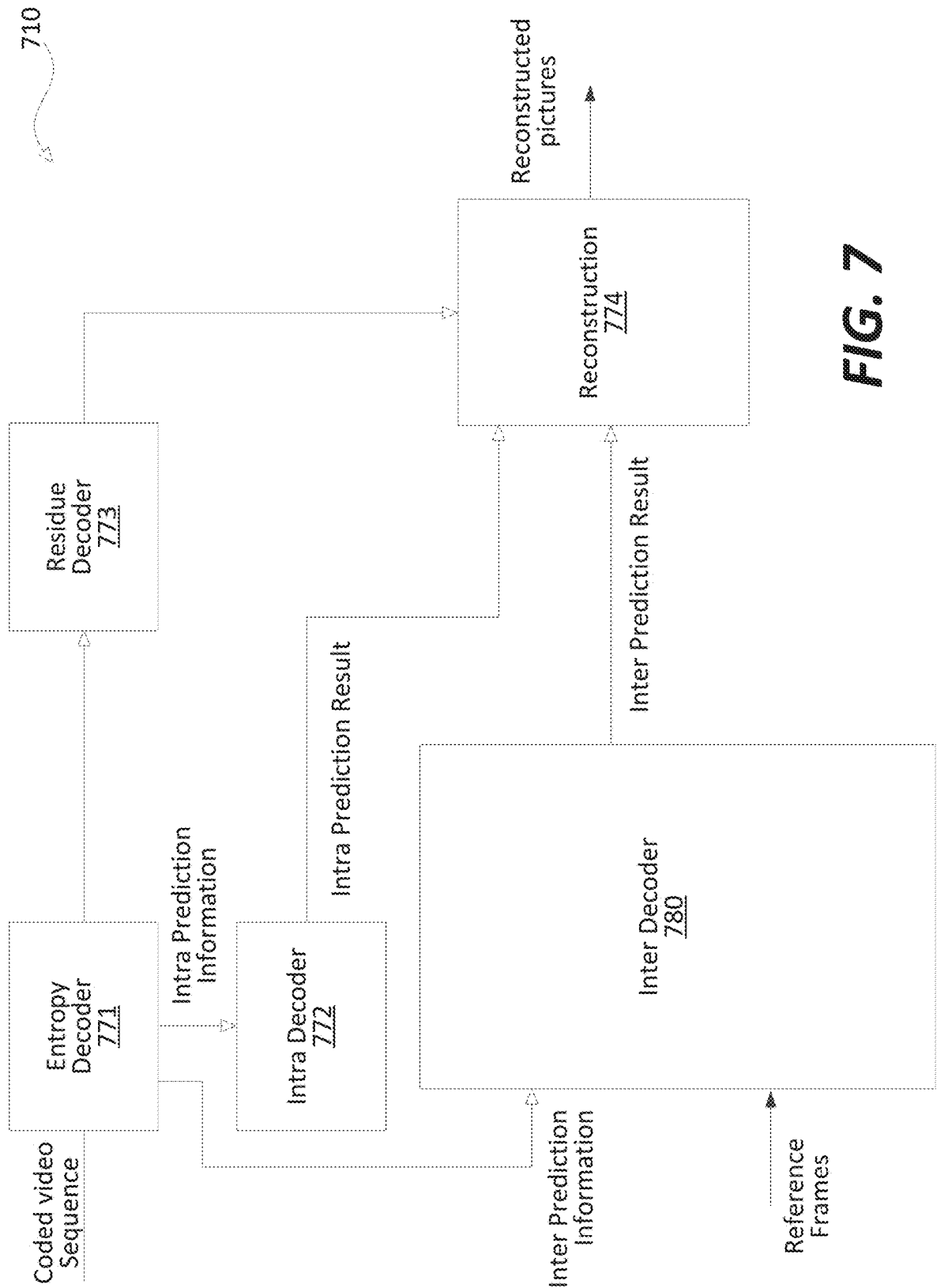
FIG. 7 shows a block diagram of a decoder in accordance with another embodiment.

FIG. 7 shows a diagram of a video decoder (710) according to another embodiment of the disclosure. The video decoder (710) is configured to receive a coded pictures that are part of a coded video sequence, and decode the coded picture to generate a reconstructed picture. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra, inter, b-predicted, the latter two in merge submode or another submode), prediction information (such as, for example, intra prediction information or inter prediction information) that can identify certain sample or metadata that is used for prediction by the intra decoder (772) or the inter decoder (780) respectively residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter QP), and that information may be provided by the entropy decoder (771) (datapath not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503) and (603), and the video decoders (310), (410) and (710) can be implemented using any suitable technique. In an embodiment, the video encoders (303), (503) and (603), and the video decoders (310), (410) and (710) can be implemented using one or more integrated circuits. In another embodiment, the video encoders (303), (503) and (503), and the video decoders (310), (410) and (710) can be implemented using one or more processors that execute software instructions.

Figure 8A:
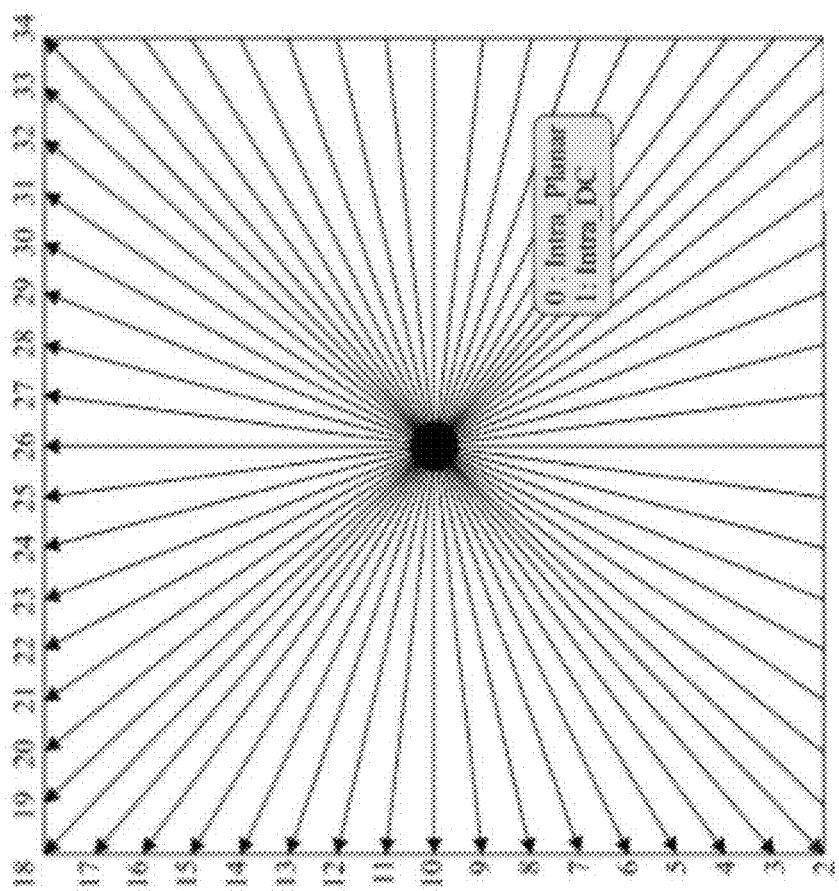
FIG. 8A shows an example of intra prediction directions as specified in H.265/HEVC.

FIG. 8A depicts an example of intra prediction directions as specified in H.265/HEVC. HEVC defines two categories of intra modes: (1) angular modes, and (2) planar mode and DC mode. There are 33 angular modes that provide codec with multiple choices to accurately model structures with various directional edges. Each angular mode is identified with a mode index (or number) from 2 to 34, and corresponds to a prediction direction indicated by an arrow in FIG. 8A. The planar mode and DC mode, numbered with 0 and 1 respectively, can be used to derive predictors estimating smooth image content. HEVC allows usage of all defined intra modes for block sizes ranging from 4×4 to 32×32 samples.

As shown, mode 10 is a horizontal mode, mode 26 is a vertical mode, and modes 2, 18, and 34 are diagonal modes. The modes 2-18 are denoted as a horizontal prediction mode set, as the predominant source of prediction is in the horizontal direction. The modes 19-34 are denoted as a vertical prediction mode set.

Figure 8B:
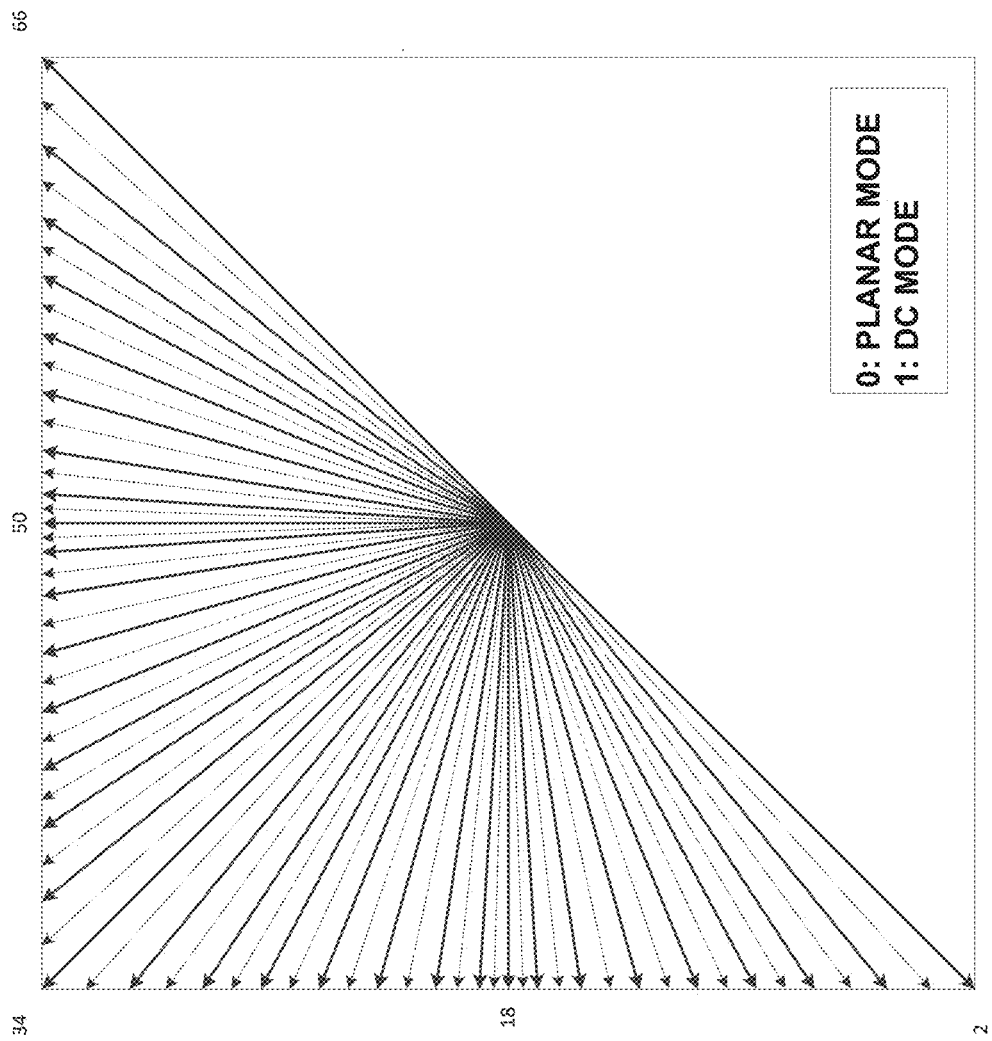
FIG. 8B shows an example of intra prediction directions as part of an intra prediction scheme proposed in Versatile Video Coding (VVC).

FIG. 8B depicts an example of intra prediction directions as part of an intra prediction scheme proposed in VVC. As shown, 65 angular (or directional) modes are defined for intra prediction in VVC, which provide more options for capturing arbitrary edge directions presented in natural video. Besides the 65 angular modes, a planar mode and a DC mode are stilled included in the intra mode set defined for the proposed intra prediction scheme.

Intra prediction can be conducted on a plurality of samples of a given picture, called henceforth a "unit". With respect to its member samples, a unit can be of any shape, continuous or non-continuous. The shape of a unit can be restricted to a rectangular block of samples. The dimension of the block are positive integer values.

The size of the block in each dimension X and Y can further be restricted to be powers of two (such as: four samples, eight samples, 16 samples, . . . ).

The shape of the block can be further restricted to be square—that is, the size of the block in X and Y dimension is equal, and may or may not be a power of two.

Before further describing the present disclosure, the terms "available" and "availability" needs to be introduced. Consider a unit of samples. Those samples can be arranged in a square, rectangular, or any other shape. Certain prediction samples (reference samples) or metadata of other prediction entities (such as prediction direction of surrounding units) may or may not be "available" for prediction of samples or other prediction entities of the unit depending on, among other factors, the spatial position of the predicted unit in a picture, the coded bitstream structure including the bitstream partitioning into slices or tiles, and so forth. In some video coding technologies, the decoding order of units (e.g., CTUs) is following a scan order—left-to-right and top-to-bottom. Processing of sub-blocks within a CTU (e.g., CU, PU, transform unit, and the like) may also follow a certain order. In such video coding technologies potential reference information and samples from units that follow the unit under reconstruction in decoding order are naturally unavailable. This results that some prediction data to the right and below a prediction unit can be unavailable.

However, certain samples and other prediction entities may be unavailable even if they belong to units that precede the unit under reconstruction in decoding order, and are located to the left and above the unit.

For example, a sample or prediction entity may be unavailable when a current unit is at the boundary of a picture segment, for example a slice or a (independent) tile. Here, the tile boundaries are treated, for the purpose of prediction, like picture boundaries. Similarly, prediction entities other than samples may be unavailable even if prediction samples were available, if the reference unit were coded in a mode which does not allow for the generation or use of the prediction entity. For example, a prediction unit coded in skip mode would not have an associated prediction direction in some coding technologies.

In some other examples, a restricted intra mode may be employed. Under such configuration, only reference to previously intra predicted neighbor blocks is permitted, while dependencies of intra blocks on inter blocks are forbidden. As a result, error propagation from previously corrupted pictures can be prevented in a lossy environment.

When a prediction sample (referring to a reference sample useful for intra prediction) or prediction entity is not available, in at least some cases, its value of the prediction sample or entity itself can be predicted or derived from neighboring samples. Of course, when predicting samples/entities from prediction samples/entities that, themselves, are predicted, the accuracy of the overall prediction mechanism can be sub-optimal. However, as the encoder selects the prediction mode based on state information that includes both prediction sample values and how that value was generated (including prediction from samples that were themselves predicted due to unavailability), it can use in at least some cases a mode that does not rely on intra prediction at all. Rate-distortion optimization techniques can be used to select the appropriate mode.

Both the predicted samples and the neighboring available samples can, for example, be luminance samples, chrominance samples, samples belong to a given color plane, and so forth. For example, in some video processing systems employing video decoders, video is sampled in a YCrCb 4:2:0 sampling structure with the chrominance samples Cr and Cb being subsampled and handled in their respective chroma planes. In such a case, intra prediction can occur separately in each of the Y, CR, CB color plane. The control of the intra prediction can, in some cases, be generated in the encoder based on the Y plane, signaled in the coded video bitstream in relation to the Y plane, and applied in the decoder to Y plane and CR/CB plane samples separately. In another example, the samples can be the green samples of a picture using RGB colorspace, and the red and blue samples again are handled in their respective color planes. In other scenarios, intra prediction is performed for one or more color planes independently from the other color planes, by both encoder and decoder.

Figure 9:
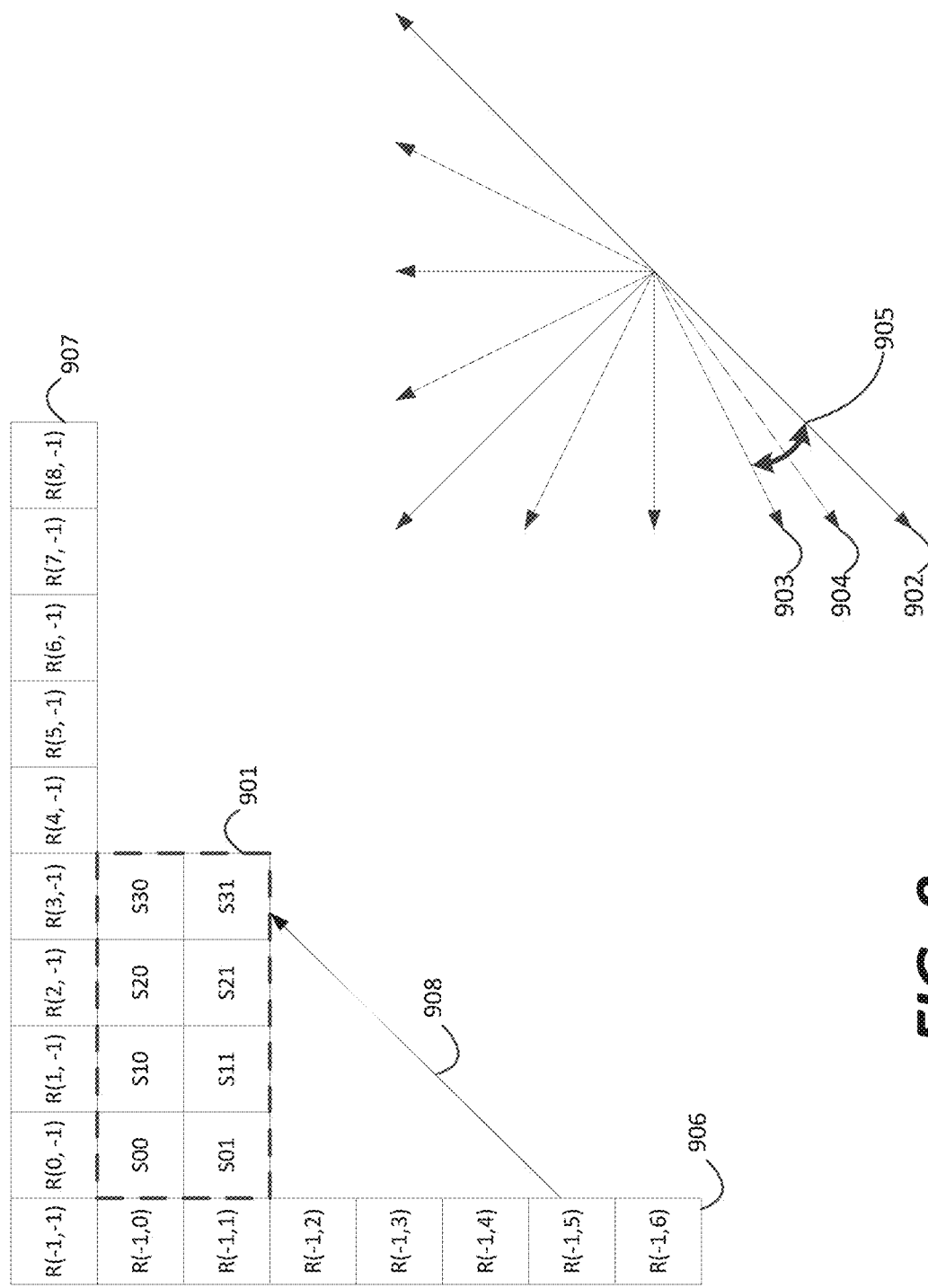
FIG. 9 shows an example where an angular subrange of intra directions has a small probability of being selected due to the non-square shape of a block.

Referring to FIG. 9, in an embodiment, a unit under reconstruction (henceforth "block") (901) may be of rectangular, but not square shape. A first set of samples p[x][y] with x=[−1], and y=[−1 to 6] is positioned in a column 906 to the left of and adjacent to block 901. A second set of samples p[x][y] with x=[−1 to 8], and y=[−1] is positioned in a row 907 above and adjacent to block 901.

Intra prediction directions can be optimized for square blocks. When using non-square blocks, certain prediction directions that can be useful for square blocks can be less useful or useless for non-square blocks, because the spatial correlation between the samples of the block (901) under reconstruction and the prediction samples is low. Consider prediction direction (902). In this direction, only samples S00 and S01 would be predicted from a sample that is a direct neighboring of the block, namely from R(−1, 1) and R(−1, 2), respectively. Other samples would be predicted from samples well outside a direct neighborhood relationship. For example, sample S31 would be predicted from sample R(−1, 5) as indicated by arrow 908, which is very far away spatially compared with, for example, samples from R(2, −1) to R(6, −1).

As intra prediction works better with a close spatial relationship of reference samples to the block, it can be unlikely that a prediction direction such as direction (902) would be chosen by a rate-distortion optimized encoder. However, when using the same mapping of directions to prediction modes as designed and optimized for square blocks, valuable "short" modes for prediction directions would be wasted for prediction directions such as direction (902). A "short" mode in this sense can be a mode that is likely to be chosen by a rate-distortion optimized encoder. When there is a direct mapping between a mode and a variable length codeword, a "short" mode would be represented by a short variable length codeword. Even with sophisticated adaptive techniques involved in some video compression technologies, a person skilled in the art can still readily identify "short" modes from "longer" modes. For example, the intra mode 902 in FIG. 9 is assigned a short variable length codeword among the prediction modes as designed and optimized for square blocks.

In the same or another embodiment, certain intra prediction directions in an angular range of intra directions located at the end of the angular range of all intra prediction directions used for square block sizes, that are unlikely to be chosen by a rate-distortion optimized encoder because of low spatial correlation, are not used. For example, for certain block sizes (see also discussion below) the directions between 45 degrees and 22.5 degrees from the horizontal in the lower right quadrant of the directions (that includes the direction 902 (45 degrees), and any directions (example: direction (904) between direction (902) and direction (903) between 45 degrees and 22.5 degrees, but excluding direction (903) at 22.5 degrees, can form an angular subrange (905). Such an angular subrange 905 of intra directions may seldom be used for a non-square block having a shape similar to block 901.

In the same or another embodiment, the aforementioned angular subrange (905) can depend on the spatial characteristics of the block. In the same or another embodiment, the spatial characteristics of the block can be the relationship of the size of the block in the X and Y dimension. As an example, in the same or another embodiment, for a block with an X:Y relationship of 2:1 such as shown in FIG. 9, the angular subrange of prediction directions unlikely to be used can be between 45 degrees and 22.5 degrees in the bottom, left quadrant. In the same or another embodiment, for a block with an X:Y relationship of 1:2, the angular spectrum of prediction directions unlikely to be used can be between 45 degrees and 22.5 degrees in the top, right quadrant. This can be based on symmetry along an axis from the top left quadrant to the bottom right quadrant.

Figure 10:
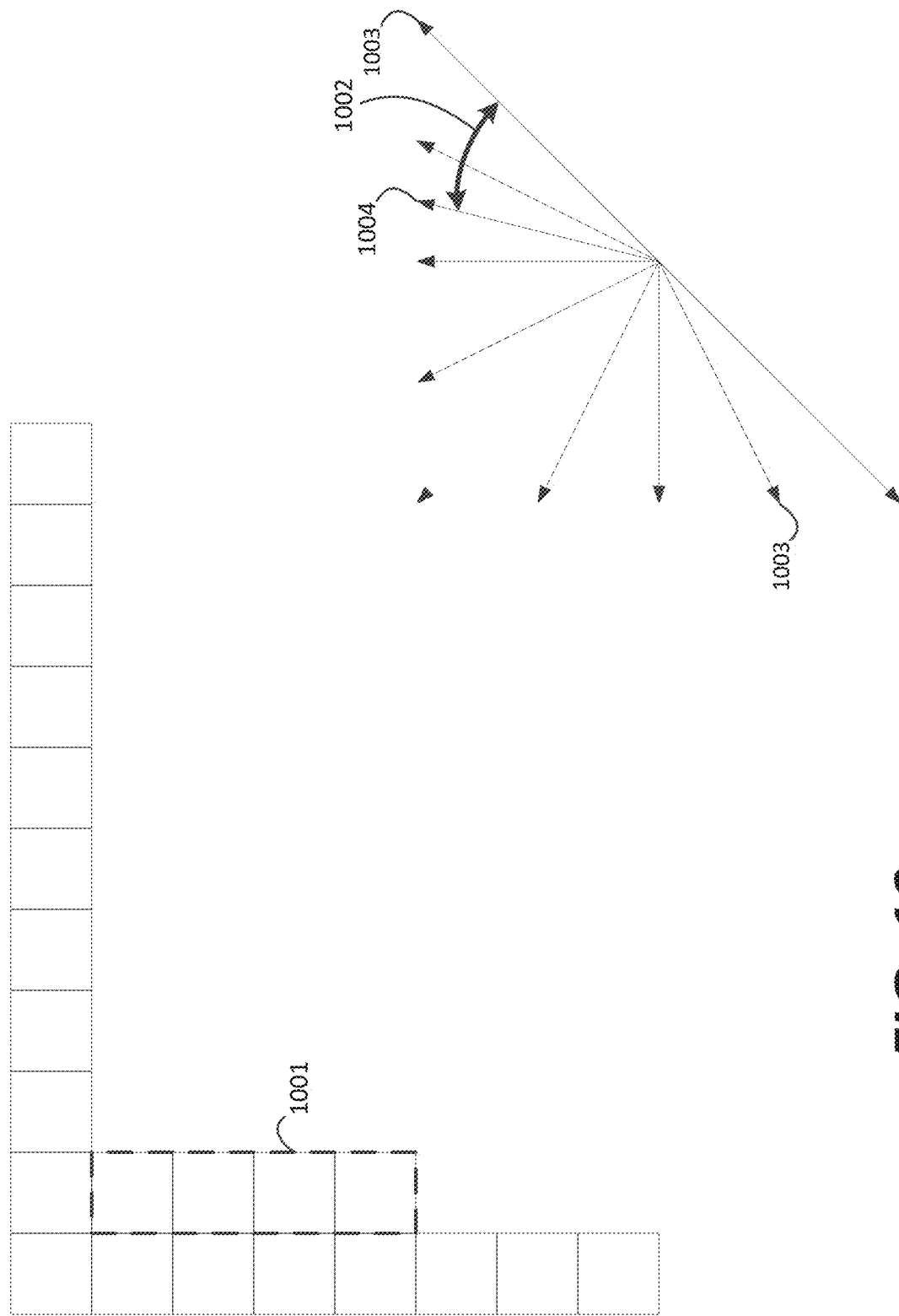
FIG. 10 shows another example where an angular subrange of intra directions has a small probability of being selected due to the non-square shape of a block.

Referring to FIG. 10, shown is another example where an angular subrange of intra directions has a small probability of be being selected due to the non-square shape of a block 1001. The block (1001) has a size of 1×4 samples, representative of block sizes with an X:Y relationship of 1:4. In such a scenario, an angular subrange (1002) of unused directions can be between 45 degrees (1003) and 11.25 degrees (1004).

Other angular subranges can be derived from other block sizes and/or X:Y relationships in block sizes.

In the same or another embodiment, the modes identified for square blocks for the directions that are part of the angular subrange are not used. As an example, briefly referring to FIG. 9, the mode associated with direction (904) that is part of the angular subrange (905) is not used. The table of modes can be shortened accordingly, leading to a smaller numbering space for modes and, thereby potential for optimized entropy coding and better coding efficiency. In the same or another embodiment, the table can be reordered according to the likelihood of the directions still represented in the table.

In the same or another embodiment, when the prediction directions in the angular subrange are not used, the associated modes can be re-assigned for other purposes. Those other purposes can, for example, include the signaling of previously unused directions, modes not directly associated with a prediction direction, filter control of filters pertaining to reference samples or intra predicted samples, and so forth.

In the same or another embodiment, certain prediction directions are added to the set of prediction directions used for square blocks. The number of these added prediction directions can be the same as the number of prediction directions removed due to their belonging to the angular subrange introduced above ("removal angular subrange" henceforth). The added directions can encompass their own angular subrange ("added angular subrange" henceforth). The added angular subrange can be of the same geometry as the removed angular subrange; suitably mirrored.

Figure 11:
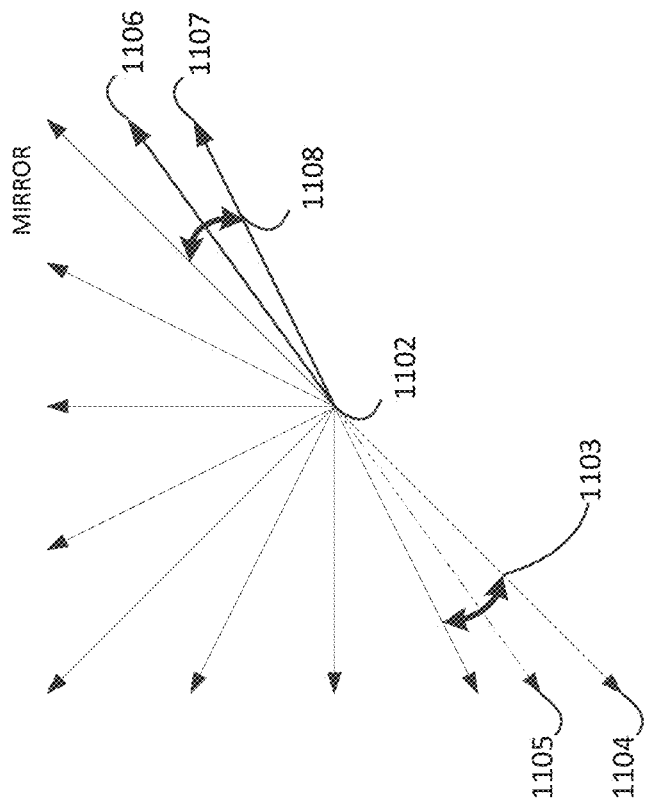
FIG. 11 shows an example where angular directions beyond the 45 degree in the top right direction are added for inter prediction.

Referring to FIG. 11, shown is a block layout similar to the one shown in FIG. 9, with a 4×2 block (1101) under reconstruction. Further shown are prediction directions (1102). Prediction directions are removed from the prediction direction set because, for example, they belong to the removal angular subrange (1103) are shown as dashed lines. Depicted are two such removed prediction directions (1104, 1105). The prediction modes used for representing these removed prediction directions (1104, 1105) can be re-used to represent, in this example two, added prediction directions (1106, 1107) in an added angular subrange (1108).

A person skilled in the art can readily understand that the added prediction directions can be beneficial when used for the block layout as shown. For example, consider prediction direction (1107). Using this prediction direction, sample S00 can be predicted from reference sample R(2, −1), and sample S30 can be predicted from sample R(5, −1). All that benefit can come without an increase of the number of prediction modes vis a vis the number of prediction modes in use for square block sizes. Certain prediction modes are simply reassigned to prediction directions more beneficial in the coding of non-square block sizes.

In order to predict samples in the second row of samples (S01, . . . , S31), when prediction direction (1106) or (1107) are in use, certain interpolation/filtering techniques can advantageously be employed to predict these samples from more than one reference sample, or to avoid aliasing artifacts. Exemplary interpolation/filtering techniques include the one specified for certain prediction direction other than evenly divisible by 45 degrees that are specified in H.265.

A person skilled in the art can readily understand that the symmetry considerations that were previously described in the context of removal of prediction directions can equally apply to the adding of prediction directions. Similarly, a person skilled in the art can readily understand that the size of the added angular subrange can be dependent on the block shape in a similar way as the size of the removal angular subrange can be dependent on the block size.

Figure 12:
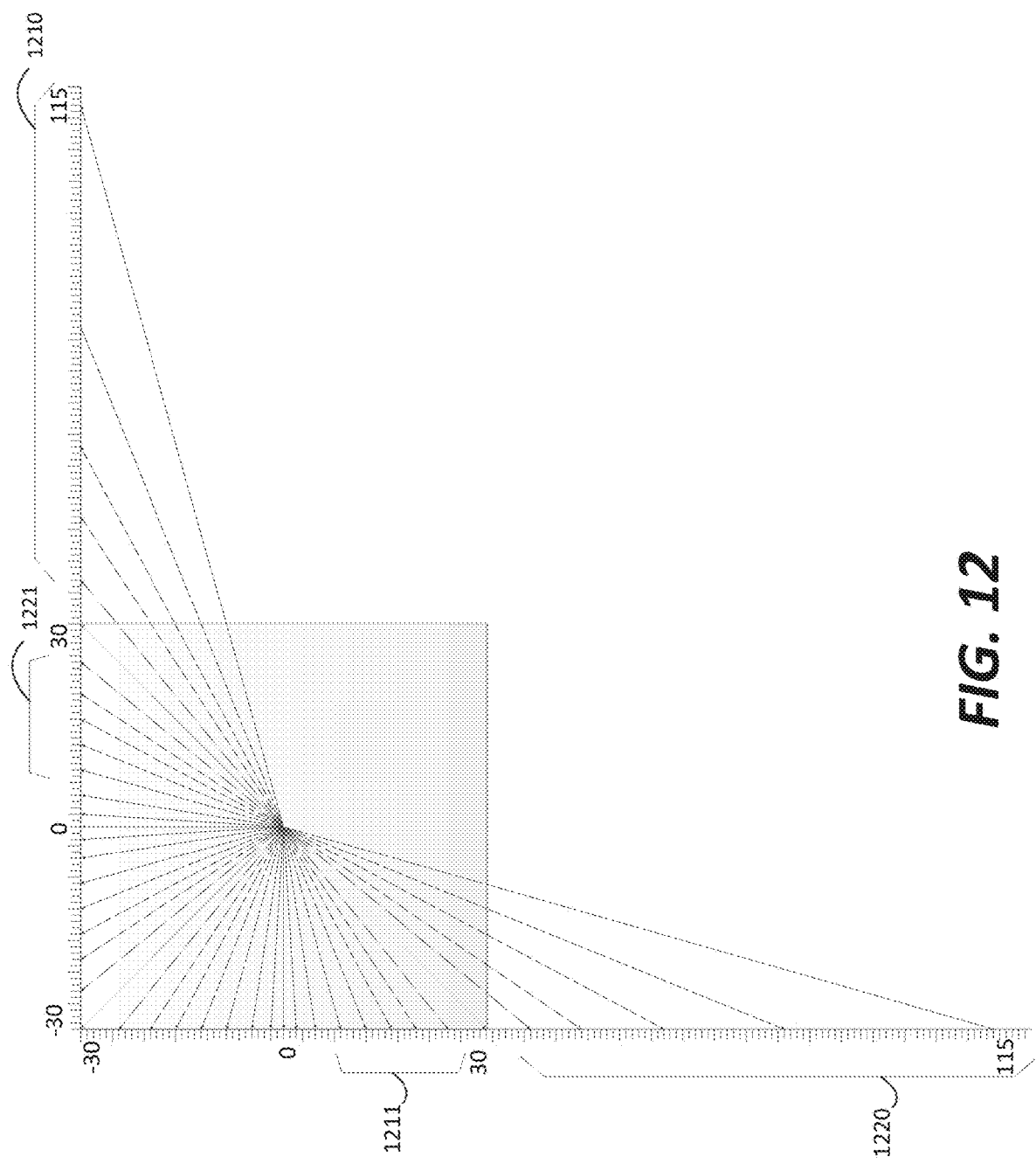
FIG. 12 depicts an example of wide-angle intra prediction modes for non-square blocks according to an embodiment of the disclosure.

FIG. 12 depicts an example of wide-angle intra prediction modes (1210) and (1220) for non-square blocks according to an embodiment of the disclosure. In FIG. 8A and FIG. 8B, all the intra prediction directions are within 45 degrees in top-right and bottom-left direction. In contrast, angular intra modes (1210) and (1220) of wide angles beyond the range of predictions in FIG. 8A and FIG. 8B are defined. The intra modes in FIG. 8A and FIG. 8B may be referred to as conventional intra prediction modes, while the angular intra modes (1210) and (1220) of wide angles may be referred to as wide angular intra prediction modes or wide angle intra prediction modes.

In FIG. 12, each direction (conventional or wide angular) can be associated with an angle specified by an angle parameter. Gradations of the angle parameters are shown along the top and left edges of FIG. 12. As shown, the angle parameters can have a value from −32 to 114 for each branch of the spectrums of intra directions.

The wide-angle intra prediction modes can be used to adaptively replace conventional intra prediction modes for non-square blocks. For example, angles going beyond 45 degree in top-right direction can be used if block width is larger than block height. Angles going beyond 45 degree in bottom-left direction can be used if block height is larger than block width. Each wide-angular intra prediction direction is associated with one conventional intra prediction direction. Each wide-angular intra prediction direction and its associated intra prediction direction captures the same directionality, but using opposite sides for reference samples (left column or top row). The usage of a wide-angular intra prediction direction can be signaled by sending a 1-bin flag for those associated directions that have an available wide-angle "flip mode". In this way, a same number of total intra modes needed to be signaled can be maintained.

In the case of the 35-direction angular intra prediction depicted in FIG. 12, for a non-square block that is flat (width W>height H), five wide angle directional modes (1210) closest to the 45-degree diagonal top-right mode can be employed which correspond to five associated traditional intra prediction mode (1211). In contrast, for a non-square block that is tall (width W<height H), five wide angle directional modes (1220) closest to the 45-degree diagonal bottom-left mode can be employed which correspond to five associated traditional intra prediction mode (1221). In the case of the 65-direction angular intra prediction, more wide angle modes may be defined for non-square blocks, such as 10 additional wide angle modes extending from the horizontal or vertical mode set.

FIG. 13 shows a table of intra predication modes replaced by wide angular modes when 35 intra prediction modes are used according to an embodiment of the disclosure. FIG. 14 shows a table of intra predication modes replaced by wide angular modes when 67 intra prediction modes are used according to an embodiment of the disclosure. In the tables, W represents a width of a non-square block, while H represents a height of the non-square block. Corresponding to different width-height ratios, different wide angular intra prediction modes may be employed.

Figure 15:
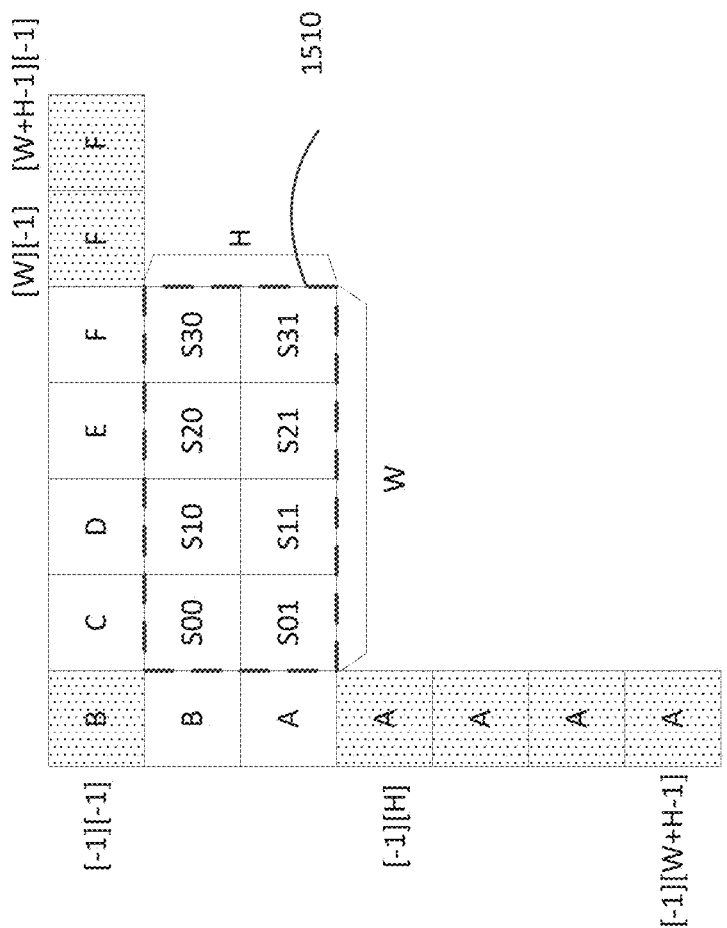
FIG. 15 depicts a block and reference samples for intra prediction of the block according to an embodiment.

FIG. 15 depicts a block (1510) and reference samples for intra prediction of the block (1510) according to an embodiment. The block (1510) is a non-square block, and has a size of W×H, where W and H denote a width and a height of the block 1510, respectively. The notation of W and H is similarly used below in this disclosure. In an example, the reference samples for intra prediction are defined to be in a range extending over W+H samples in horizontal or vertical direction plus the top left neighbor corner sample next to the block (1510). Thus, in either vertical or horizontal direction, there are a total of W+H+1 reference samples. The samples can be identified use a coordinate system similar to the FIG. 9 example.

In one example, the reference samples are stored to a buffer prior to subsequent intra prediction processing. This operation is so called as padding a memory buffer. During the memory padding operation, reference samples are obtained to pad the buffer.

As described, some or all of the reference samples in the range as defined above may not be available for intra prediction. Before or during the padding operation, the availability of reference may have to be checked. In one example, for a reference sample that is not available, the location in the buffer corresponding to the unavailable reference sample can be filled with the nearest available reference sample. Such a process is referred to as a reference sample substitution process where unavailable samples are replaced with certain sample values.

In the FIG. 15 example, the prediction samples available at vertical direction have sample values of A and B, and the prediction samples available at horizontal direction have sample values from C to D. However, the prediction samples, as indicated by shaded cells in FIG. 15, including sample [−1][−1] and samples ranging from p[−1][H] to p[−1][W+H−1] at vertical direction and from p[W][−1] to p[W+H−1][−1] in horizontal direction, are not available. Accordingly, a nearest available reference sample is used to pad the corresponding locations in the buffer. In alternative example, sample values can be derived from available reference samples using a pre-defined function (e.g., linear extrapolation) and used to replace the unavailable reference samples. In this way, a complete set of 37 or 67 angular prediction modes can be used regardless of the availability of neighboring reference samples.

Before applying the obtained reference samples to an actual intra predication process, a low-pass filtering is conditionally applied to the reference samples. The filtering process can improve visual appearance of the prediction block by avoiding steps in the values of reference samples that could otherwise generate unwanted directional edges to the prediction block. Activation of the smoothing filter depends on, for example, applicable intra prediction mode and the block size.

Example I: Reference Sample Range for Wide Angular Intra Prediction

Figure 16:
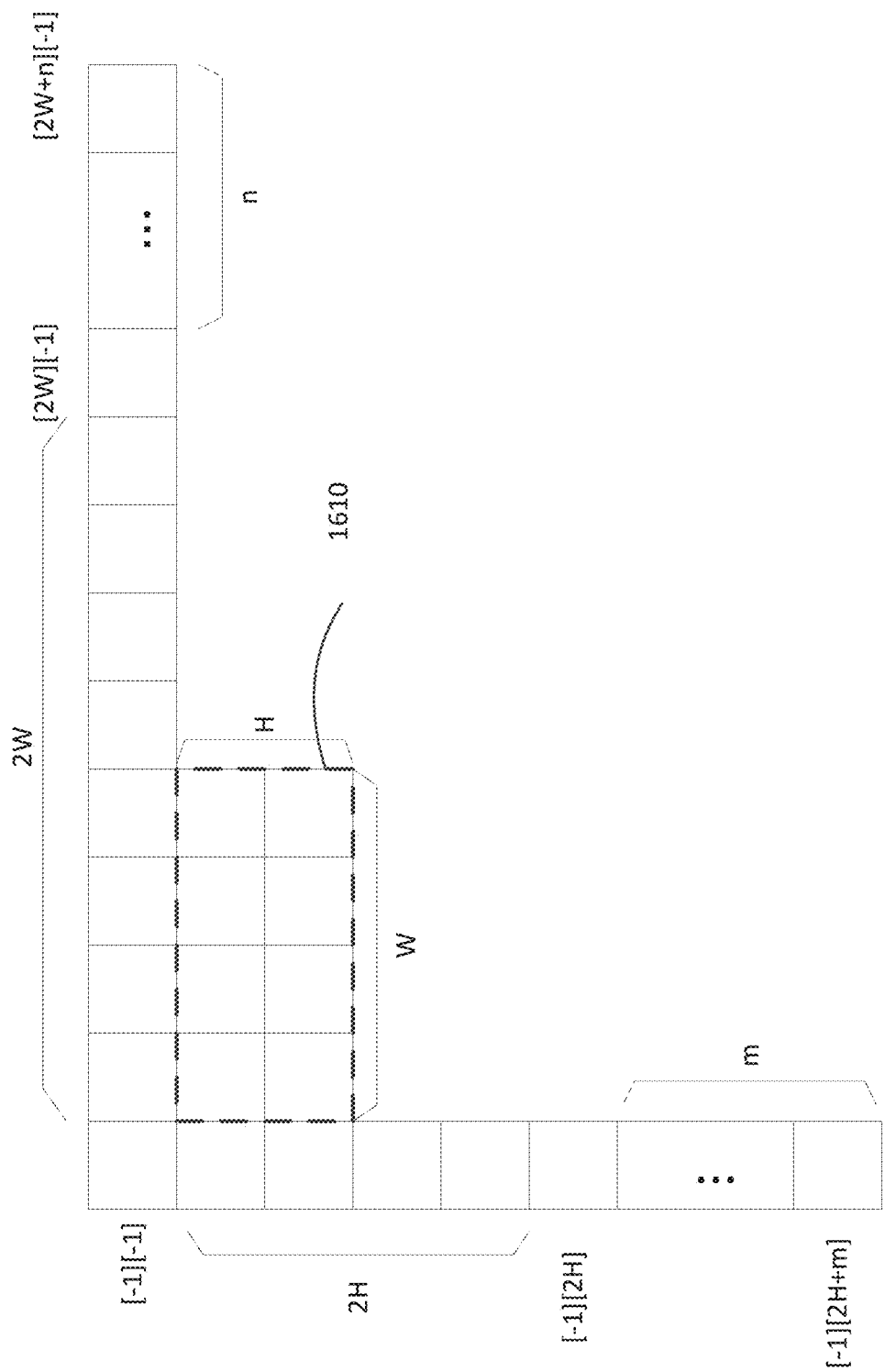
FIG. 16 illustrates an example for defining a range of reference samples for intra prediction of a non-square block according to an embodiment of the disclosure.

FIG. 16 illustrates an example for defining a range of reference samples for intra prediction of a non-square block (1610) according to an embodiment of the disclosure. The non-square block (1610) has a size of W×H samples, where W and H denote a width and a height of the block (1610), respectively. While the non-square block (1610) is shown on FIG. 16 as a block having a size of 4×2 samples, in other examples, the W and H may take other different values leading to a non-square block (1610) having a different size or shape from the 4×2 sample block. Accordingly, the range of the reference samples p[x][y] used for generating an intra predictor of the block (1610) are defined to be x=[−1], y=[−1 to (2H+m)] in vertical direction, and x=[−1 to (2W+n)], y=[−1] in horizontal direction.

The range defined in FIG. 16 example is more suitable for the purpose of employing wide angular intra prediction modes compared with that defined in the FIG. 15 example. In the FIG. 15 example, the reference samples for intra prediction are defined to be in a range that includes an equal number of W+H+1 samples in the vertical direction or horizontal direction. Such a reference sample range is not suitable for supporting usage of wide angular intra prediction modes. For example, when a wide-angle direction extending beyond 45 degree in up-right direction is considered for intra prediction of the bottom-right corner sample of the block (1510), there would be no reference samples available in the horizontal direction after the reference sample p[W+H−1][−1]. Thus, wide angular intra prediction scheme cannot work properly.

In contrast, in FIG. 16 example, the reference sample range is defined in a way that the range will adaptively change depending on the shape of the block (1610) in either the vertical or horizontal direction of the reference sample. For example, the numbers of reference samples in the vertical and horizontal directions (or referred to as height direction and width direction) can be different, and can depend on the respective height H or width W of the block (1610). For example, for a block size that the width W greater than the height H, more number of reference samples can be defined in the horizontal direction (along the width direction) than in the vertical direction.

In addition, additional parameters n and m are employed to further improve the flexibility of the reference sample range. The n and m can be adjusted according to the width, height, or shape (e.g., indicated by a width/height ratio) of the block (1610). For example, when the block (1610) is flat, m can be added to the number of reference samples in the horizontal direction, and can be assigned with a value that can further extend the reference sample range in the horizontal direction.

The following are some examples of how m and n is adjusted according to the block size, such as the width, height, or width/height ratio of the block (1610). In one example, m is set to be equal to n when the width is equal to the height (assuming a square block different from the block (1610)). In one example, m is set to be smaller than n when the width is larger than height. In one example, m is set to be larger than n when the width is less than the height. In one example, when the width is larger than the height and the width/height ratio is equal to or less than 2, n is set to be equal to 0. In one example, when the width is smaller than the height and the width/height ratio is equal to or larger than ½, m is set to be equal to 0.

In one example, when the width is larger than the height and the width/height ratio is larger than 2, n can be set to be larger than 10, for example, in a range of 10, 11, 12, 13, 14, or 15. In one example, when the height is larger than width and the height/width ratio is larger than 2, m can be set to be larger than 10, for example, in arrange of 10, 11, 12, 13, 14, or 15. In one example, when the width is larger than the height, n can be set to be larger than 10, for example in a range of 10, 11, 12, 13, 14, or 15. In one example, when the height is larger than the width, m can set to be larger than 10, for example in a range of 10, 11, 12, 13, 14, or 15.

In one example, when a 2*L+1 tap horizontal filter (e.g. a smoothing filter) is applied to all pixels (including the most right pixel) of reference samples in the horizontal direction, n can be set to be equal to L. In one example, when a 2*K+1 tap vertical filter (e.g. a smoothing filter) is applied to all pixels (including the most bottom pixel) along the vertical reference sample line, m can be set to be equal to K.

Example II: Reference Sample Range for Wide Angular Intra Prediction

Figure 17:
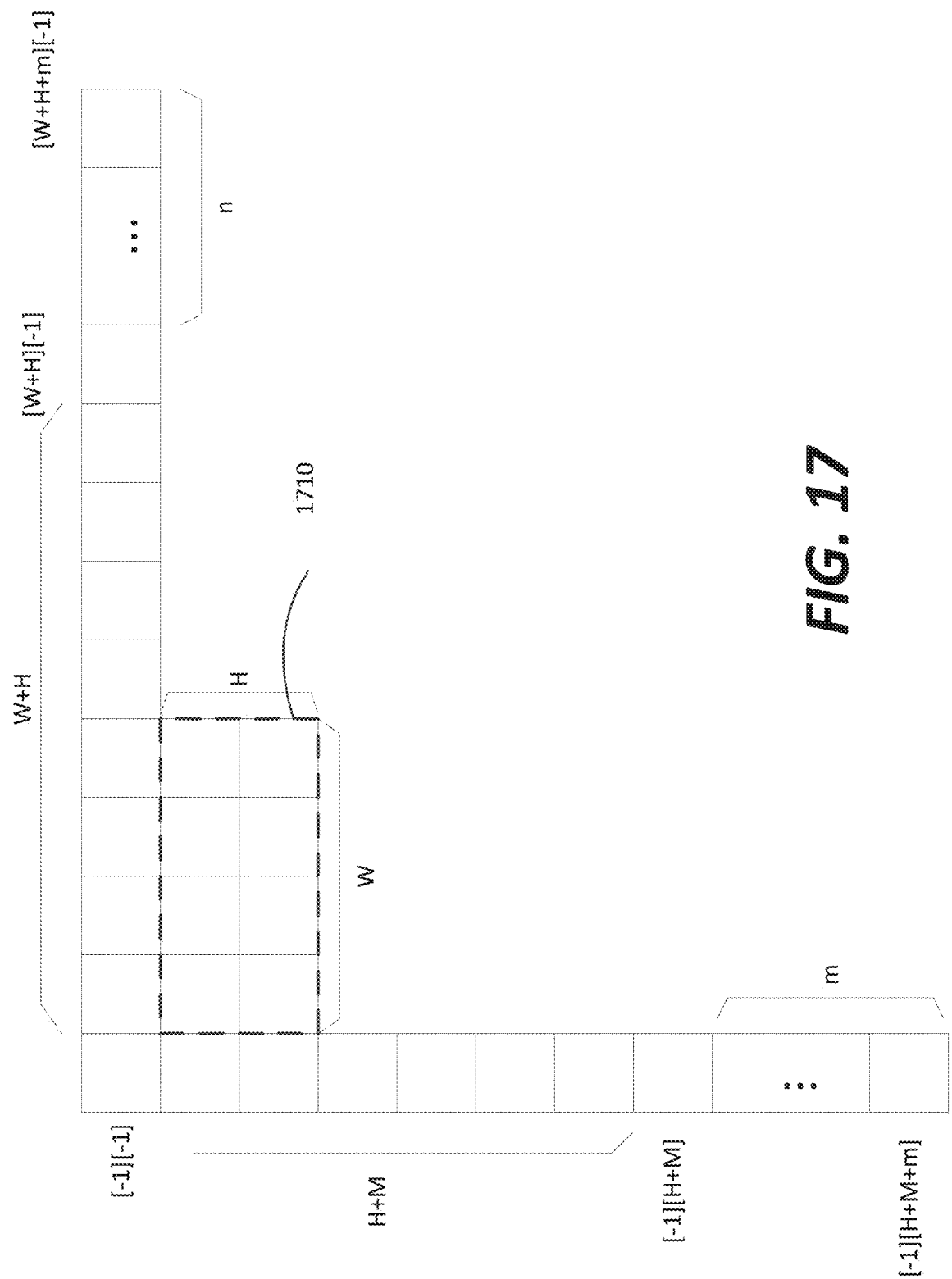
FIG. 17 illustrates another example for defining a range of reference samples for intra prediction of a non-square block according to an embodiment of the disclosure.

FIG. 17 illustrates another example for defining a range of reference samples for intra prediction of a non-square block (1710) according to an embodiment of the disclosure. Similarly, the block (1710) has a width denoted with W, and a height denoted with H. The reference samples p[x][y] are defined to be in a range of x=[−1], y=[−1 to (W+H+m)] for the vertical direction samples, and x=[−1 to (W+H+m)], y=[−1] for the horizontal direction samples.

The value of m can be adjusted according to the size of block (1710), such as the width, height, or width/height ratio of the block (1710). The following are some examples. In one example, m is set to be zero, when the width is equal to the height (assuming a square block different from the block (1710)). In one example, m is larger than 0 when the width is not equal to the height. In another example, m is set with a specific value, such as 3.

Example III: Reference Sample Range for Wide Angular Intra Prediction

In one example, reference samples p[x][y] for intra prediction of a non-square block (W×H samples) is defined to be in a range of x−[1−1], y=[−1 to w], and x=[0 to v]. The values of w and v is dependent on the block size of the block such as the width, height, or width/height ratio of the block. In one example, v can be defined to be H+(1/2)W, H+(1/2)W+1, or H+(1/2)W+2, when the width is larger than the height. In one example, w can be defined to be W+(1/2)H, W+(1/2)H+1, or W+(1/2)H+2, when the height is larger than the width.

Example IV: Reference Sample Substitution Process for Intra Sample Prediction

A reference sample substitution process for intra prediction of a block is described. In the description, nWidth denotes a width of the block under processing, and nHeight denotes a height of the block under processing. The notation of nWidth and nHeight is similarly used below in this disclosure.

Inputs to this process are: reference samples p[x][y] with x=[−1], y=[−1 to nWidth+nHeight+3] and x=[0 to nWidth+nHeight+3], y=[−1], for intra sample prediction; variables nWidth and nHeight specifying the block width and height; a variable cIdx specifying the colour component of the current block.

Outputs of this process are the modified reference samples p[x][y] with x=[−1], y=[−1 to nWidth+nHeight+3] and x=[0 to nWidth+nHeight+3], y=[−1], for intra sample prediction for intra sample prediction.

The variable bitDepth is determined according to the variable cIdx. For different color components, a different bit depth value may be obtained.

The values of the samples p[x][y] are modified as follows:

(1) If all samples p[x][y] are marked as "not available for intra prediction", a nominal average sample value for a given depth, such as the value 1<<(bitDepth−1), is substituted for the values of all samples p[x][y].

(2) Otherwise (at least one but not all samples p[x][y] are marked as "not available for intra prediction"), the unavailable reference samples are substituted by using the available reference samples. The unavailable reference samples are substituted by scanning the reference samples in clock-wide direction and using the latest available sample value for the unavailable ones. Specifically, the following ordered steps are performed:

1. When p[−1][nWidth+nHeight+3] is marked as "not available for intra prediction", search sequentially starting from x=[−1], y=[nWidth+nHeight+3] to x=[−1], y=[−1], then from x=[0], y=[−1] to x=[nWidth+nHeight+3], y=[−1]. Once a sample p[x][y] marked as "available for intra prediction" is found, the search is terminated and the value of p[x][y] is assigned to p[−1][nWidth+nHeight+3].

2. Search sequentially starting from x=[−1], y=[nWidth+nHeight+2] to x=[−1], y=[−1]. When p[x][y] is marked as "not available for intra prediction", the value of p[x][y+1] is substituted for the value of p[x][y].

3. For x=[0 to nWidth+nHeight+3], y=[−1], when p[x][y] is marked as "not available for intra prediction", the value of p[x−1][y] is substituted for the value of P[x][Y].

As a result of the above process, all samples p[x][y] with x=[−1], y=[−1 to nWidth+nHeight+3] and x=[0 to nWidth+nHeight+3], y=[−1], are marked as "available for intra prediction". The output samples can subsequently be input to an intra prediction process for generating a predictor block of the block under processing.

Figure 18:
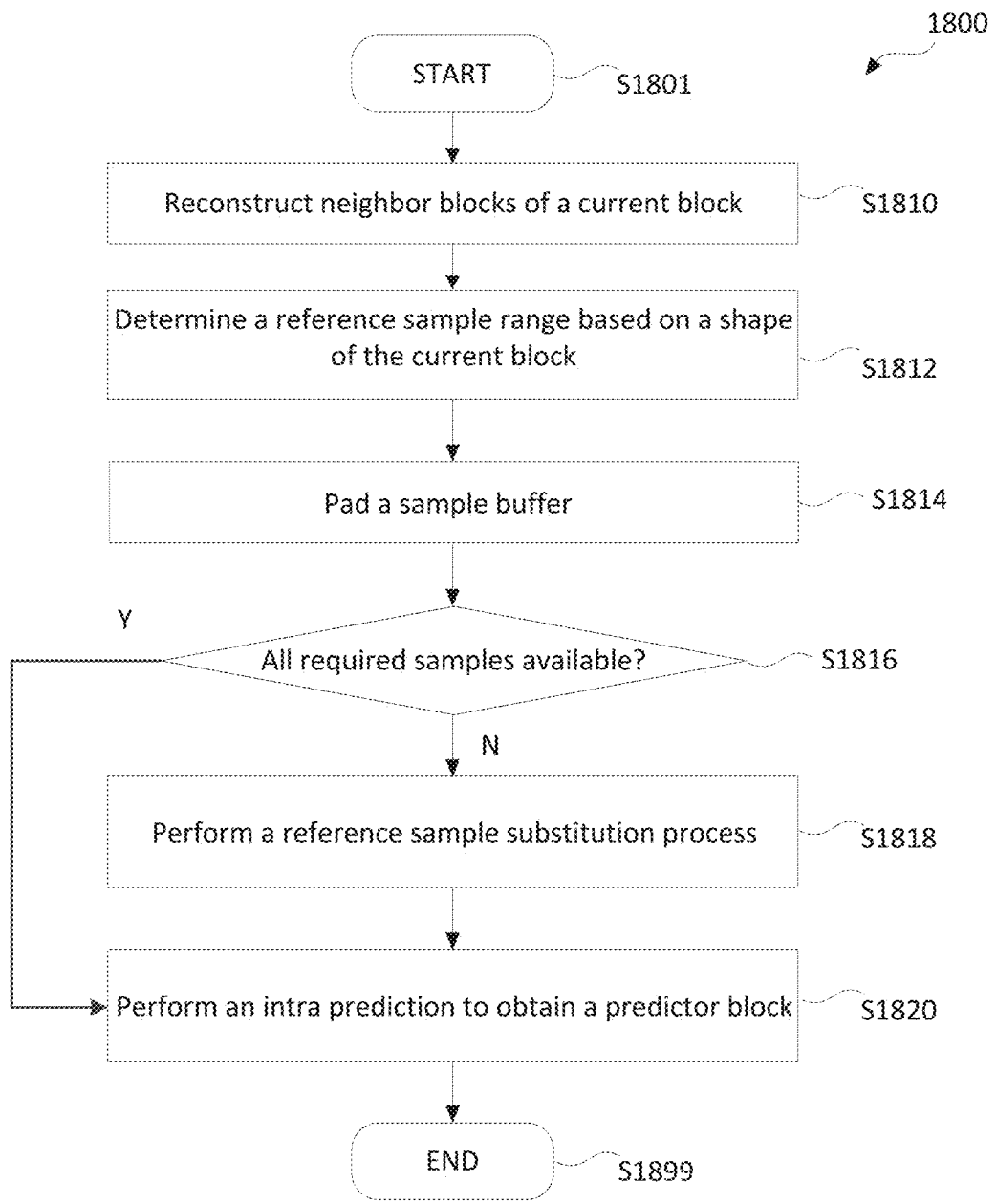
FIG. 18 shows an example reference sample buffer padding process according to an embodiment of the disclosure.

Example V: Reference Sample Buffer Padding Process for Wide Angular Intra Prediction FIG. 18 shows an example reference sample buffer padding process 1800 according to an embodiment of the disclosure. The process 1800 can be performed at a video decoder or a video encoder. The process 1800 employs the reference sample range determination schemes suitable for wide angular intra prediction. Accordingly, a reference sample range can be suitably defined to support wide angle directions. A predictor of a non-square block can be obtained as a result of the process 1800. The non-square block is referred to as a current block in the description below. The process 1800 can start from S1801, and proceed to S1810.

At S1810, one or more neighbor blocks of the current block are reconstructed. For example, a picture can be partitioned into blocks, and processed according to a certain order. Some of the neighbor blocks (e.g., blocks on the top or left of the current block) can be reconstructed before the current block being processed. The reconstructed blocks include reconstructed samples, part of which may be used as reference samples for the intra prediction of the current block.

At S1812, the reference sample range is determined based on a shape/size of the current block. As described in this disclosure, there can be various ways for defining a reference sample range suitable for supporting the wide angular intra prediction. For example, a reference sample range used for processing the current block can be x=[−1], y=[−1 to (2H+m)] in vertical direction, and x=[−1 to (2W+n)], y=[−1] in horizontal direction, as described in Example I. The parameters m and n can be determined according to the shape of the current block, for example, indicated by a width, a height, or a width/height ratio of the current block, as described in Example I.

At S1814, a padding operation of a sample buffer is performed. For example, based on the reference sample range determined at S1812, reconstructed samples of neighbor blocks of the current block over the determined reference sample range can be retrieved from a memory location, and stored to the sample buffer. It is noted that part or all of the reference samples within the determined reference sample range may not be available. For example, the current block may be positioned at an edge of a picture or a slice, thus neighbor blocks may not exist or available. Intra prediction of the current block may be restricted from using an inter coded neighbor block. Some of the neighbor blocks of the current block have not been processed. Under the above scenarios, reference samples within the determined range and required for intra prediction of the current block may be unavailable. In one example, for the unavailable reference samples, corresponding memory locations in the sample buffer can be marked. For example, a flag can be stored in those locations and used as a mark to indicate the unavailability.

At S1816, it is determined whether all samples required for processing the current block (all samples within the reference sample range determined at S1812) are available, for example, based on the marks in the sample buffer. When all the required samples are available, the process 1800 can proceed to S1820. Otherwise, the process proceeds to S1818.

At S1818, a reference sample substitution process similar to the Example IV can be performed to replace the unavailable samples in the sample buffer with a suitable sample value. As a result, all required samples for processing the current block are available now.

At S1820, an intra prediction is performed to obtain a predictor block of the current reference block. For example, at the encoder side, different intra predictions may be tested and one may be selected based on a rate-distortion optimization evaluation. A flag indicting the selected intra mode may be later included in a coded bit stream and signaled to a decoder. At the decoder side, an intra prediction mode for processing the current block may be received from a decoder, and accordingly be used for processing the current block. A low-pass filtering process may be performed to smooth the reference samples in the sample buffer depending on a size and applied intra prediction of the current block. Corresponding to an intra prediction mode applied, the reference samples in the sample buffer may be used to calculate intra predictor samples. A post-processing process may be performed, for example, to reduce or remove discontinuities at the boundary of the predictor block. As a result of S1820, the predictor of the current block can be obtained. The process 1800 can proceed to S1899 and terminate at S1899.

Example VI: Reference Sample Range for Wide Angular Intra Prediction

Padding different numbers of reference samples to a buffer memory can be performed dependent on coded information of a current block, including but not limited to, block size, block width (nWidth), block height (nHeight), block width to height ratio, block area size, or intra prediction direction.

In one example, 2*max (nWidth, nHeight)+1 samples are padded both for above (vertical) and left (horizontal) neighboring reference samples of the block. In one example, 2*max (nWidth, nHeight)+1 samples are padded for a long side and nWidth+nHeight+1 samples for a short side. If the width is equal to or larger than the height, the top row of the block corresponding to the width is referred to as a long side, and the left column of the block corresponding to the height is referred to as a short side. Otherwise, the top row of the block is referred to as a short side and the left column of the block is referred to as a long side. The notation of long side or short side is similarly used below in this disclosure.

In one example, 2*nWidth+3 samples are padded for the above reference samples and 2*nHeight+3 samples are padded for the left reference samples. In one example, pad 2*nWidth+3 samples are padded for the above reference samples and 2*nHeight+3 samples are padded for the left reference samples when width/height<=4 or height/width<=4. Otherwise, 2*max (nWidth, nHeight)+1 samples are padded for the long side and pad 2*min (nWidth, nHeight)+1+M are padded for the short side, where M can be 10, 11, 12, 13 or 14.

In one example, 2*nWidth+M samples are padded for the above reference samples and 2*nHeight+N samples are padded for the left reference samples, where M and N depends on the coded information, including but not limited to, block size, block width, block height, block width to height ratio, block area size, intra prediction direction.

Figures 19, 20:
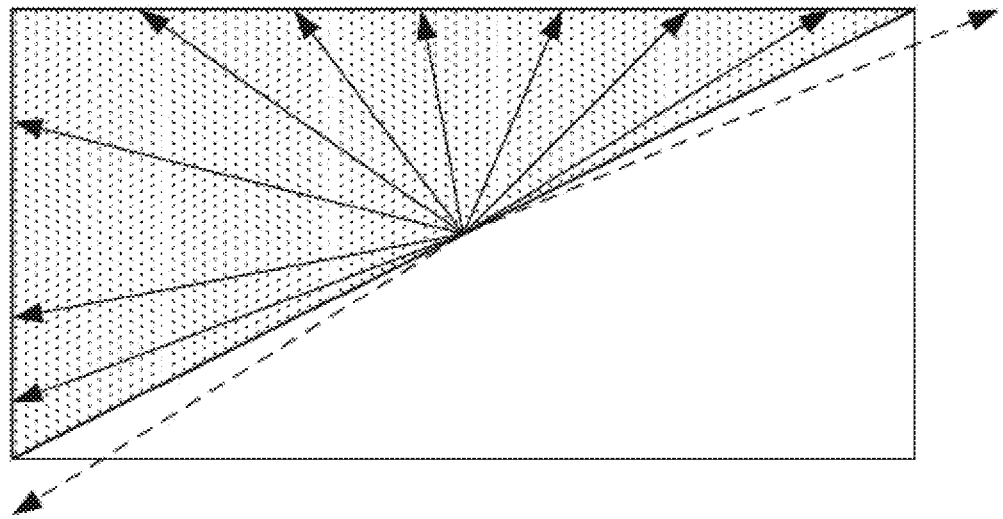
FIG. 19 shows an example of intra prediction mode replacement for wide angular intra prediction according to an embodiment of the disclosure.
FIG. 20 shows an example where members of 35 intra prediction modes are replaced with wide-angular modes corresponding to different block shapes (width/height ratios) according to an embodiment of the disclosure.

Example VII: Intra Prediction Mode Replacement for Wide Angular Intra Prediction As depicted in FIG. 19, several conventional angles are removed at the short side, and the same number of wide angles are added at the long side. After removing the angles at the short side, the remaining angles are all within the diagonal direction of the respective block shape, where the diagonal direction is indicated by the line connecting the top-right and bottom-left corners of the respective block. The prediction angles (solid arrows) located within the top-left textured triangle area are intra prediction angles within the diagonal direction that are employed in Example VII. The prediction angles (dotted angles) located outside the top-left textured triangle area are intra prediction angle beyond the diagonal direction that are not employed in Example VII.

Corresponding to the scheme illustrated in FIG. 19, FIG. 20 shows an example where members of 35 intra prediction modes are replaced with wide-angular modes corresponding to different block shapes (width/height ratios).

Figures 21, 22:
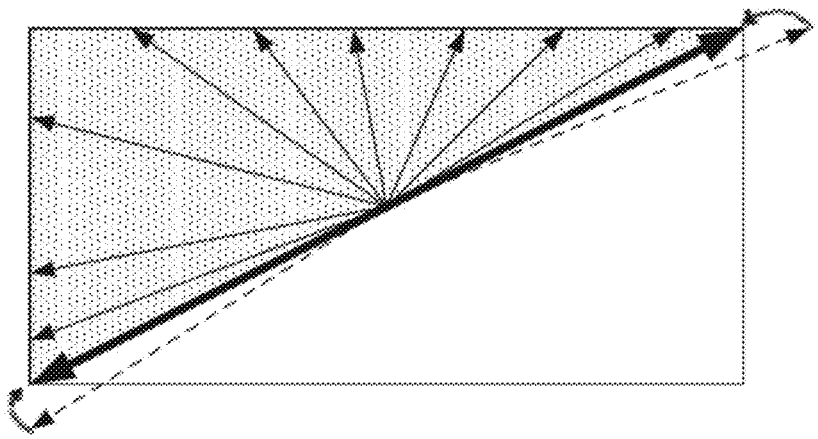
FIG. 21 shows an example where members of 67 intra prediction modes are replaced with wide-angular modes corresponding to different block shapes (width/height ratios) according to an embodiment of the disclosure.
FIG. 22 shows an example where several conventional angles (such as the 35 or 67 intra mode configuration) at the short side of a block are removed, and the same number of wide angles are added at the long side of the block.

Corresponding to the scheme illustrated in FIG. 19, FIG. 21 shows an example where members of 67 intra prediction modes are replaced with wide-angular modes corresponding to different block shapes (width/height ratios).

Example VIII: Intra Prediction Mode Replacement for Wide Angular Intra Prediction As depicted in FIG. 22, several conventional angles (such as the 35 or 67 intra mode configuration) at the short side are removed, and the same number of wide angles are added at the long side. After removing the angles at the short side, the remaining angles are all within diagonal angles of each block shape, except N prediction angles. Example values of N include but are not limited to 1, 2, 3, 4. After that, the N prediction angles are further adjusted to be within the diagonal angles. As shown in FIG. 22, the prediction angles beyond the diagonal direction (dotted arrows) are adjusted to be a prediction angle (thick arrow) that is within the diagonal direction (top-left triangle region). In case one or multiple prediction angles are adjusted, those angles that are already within the diagonal direction are also further adjusted to equalize the distribution of all available prediction.

Example IX: Constraining Intra Prediction Angles according to a Reference Sample Range Instead of constraining the prediction angles to be within the diagonal directions, as shown in FIG. 19 and FIG. 22, the prediction angles can be constrained in a way that the available prediction angles only utilize reference samples within a pre-defined range (or group, or number) of reference samples.

In one example, it is constrained that only top m*nWidth+1+offsetX (including the top-left corner) reference samples are can be used for intra prediction, and any intra prediction angles that may use reference samples outside the top n*nWidth+1+offset samples are disallowed. Example values of offsetX may include, but not limited to 1, 2, 3, 4, ... 14, ... 48. Example values of m and n may include, but not limited to 1, 2, 3, 4.

In one example, it is constrained that only top m*nHeight+1+offsetY (including the top-left corner) reference samples are can be used for intra prediction, and any intra prediction angles that may use reference samples outside the top n*nHeight+1+offset samples are disallowed. Example values of offsetY may include, but not limited to 1, 2, 3, 4, ... 14, ... 48. Example values of m and n may include, but not limited to 1, 2, 3, 4.

In one example, it is constrained that only m*max (nHeight, nWidth)+1+offset (including the top-left corner) reference samples are can be used for intra prediction, and any intra prediction angles that may use reference samples outside the n*max(nHeight, nWidth)+1+offset samples are disallowed. Example values of offset may include, but not limited to 1, 2, 3, 4, ... 14, ... 48. Example values of m and n may include, but not limited to 1, 2, 3, 4.

In one example, it is constrained that only m*min (nHeight, nWidth)+1+offset (including the top-left corner) reference samples are can be used for intra prediction, any intra prediction angles that may use reference samples outside the n*min(nHeight, nWidth)+1+offset samples are disallowed. Example values of offset may include, but not limited to 1, 2, 3, 4, ... 14, ... 48. Example values of m and n may include, but not limited to 1, 2, 3, 4.

Example X: Constraining Intra Prediction Angles within the Diagonal Direction of a Non-square Block Some modes, such as modes 3, 5, 6, 7, 8, or 33, 31, 30, 29, 28, in the short side of the non-square block can be removed when the width/height ratio are 2 (or 1/2), 4 (or 1/4), 8 (or 1/8), 16 (or 1/16), 32 (1/32), or the like in case of 35 intra prediction modes. Some modes, such as 6, 10, 12, 14, 16, or 62, 58, 56, 54, 52 modes in the short side can be removed when the width/height ratio are 2 (or 1/2), 4 (or 1/4), 8 (or 1/8), 16 (or 1/16), 32 (1/32), or the like, in case of 67 intra prediction modes.

In one embodiment, for the remaining modes in the short side, if the angle of that mode is beyond the diagonal direction of that block, that angle will be mapped to the diagonal direction of that block.

In one example, in case of 35 intra prediction modes, when the width/height=2 (or 1/2), the angle of mode 5 (or 31) is 17/32, which is beyond the diagonal direction of that block, the angle of mode 5 (or 31) is mapped to 16/32. When the width/height=4 (or 1/4), the angle of mode 7 (or 29) is 9/32, which is beyond the diagonal direction of that block, the angle of mode 7 (or 29) is mapped to 8/32. When width/height=8 (or 1/8), the angle of mode 8 (or 28) is 5/32, which is beyond the diagonal direction of that block, the angle of mode 8 (or 28) is mapped to 4/32.

In one example, in case of 67 intra prediction modes, when the width/height=2 (or 1/2), the angle of mode 8 (or 60) is 17/32, which is beyond the diagonal direction of that block, the angle of mode 8 (or 60) is mapped to 16/32. When the width/height=4 (or 1/4), the angle of mode 12 (or 56) is 9/32, which is beyond the diagonal direction of that block, the angle of mode 12 (or 56) is mapped to 8/32. When width/height=8 (or 1/8), the angle of mode 14 (or 54) is 5/32, which is beyond the diagonal direction of that block, the angle of mode 14 (or 54) is mapped to 4/32.

Example XI: Angle Table Modification to Contain Diagonal Directions of Various Block Shapes The angles of the intra prediction modes are modified so that angles contain the diagonal direction of all block shapes. In one embodiment, angles {1/32, 2/32, 4/32, 8/32, 16/32, 32/32} are included into the angle table. In another embodiment, the prediction angle accuracy is increased from 1/32 to 1/64 sample, and angles {1/64, 2/64, 4/64, 8/64, 16/64, 32/64, 64/64} are included into the angle table. In another embodiment, the prediction angle accuracy is increased from 1/32 to 1/128 sample, and angles {1/128, 2/128, 4/128, 8/128, 16/128, 32/128, 64/128, 128/128} are included into the angle table. In another embodiment, in case of 35 intra prediction modes, an angle table is modified and shown in FIG. 23. In another embodiment, in case of 67 intra prediction modes, an angle table is modified and shown in FIG. 24.

The techniques described above, can be implemented as computer software using computer-readable instructions and physically stored in one or more computer-readable media. For example, FIG. 25 shows a computer system (2500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 25:
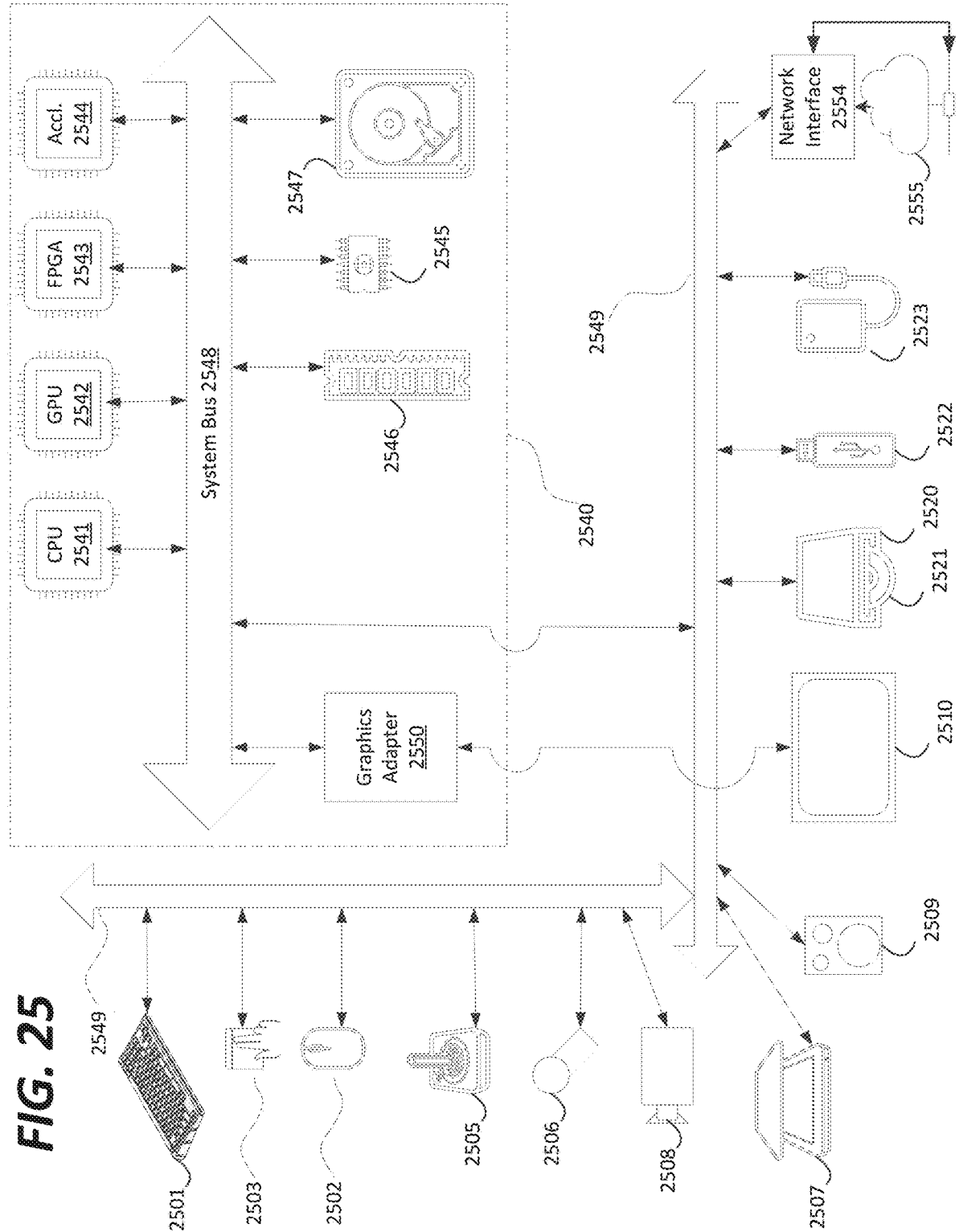
FIG. 25 is a schematic illustration of a computer system in accordance with an embodiment.

The components shown in FIG. 25 for computer system (2500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2500).

Computer system (2500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2501), mouse (2502), trackpad (2503), touch screen (2510), data-glove (not shown), joystick (2505), microphone (2506), scanner (2507), camera (2508).

Computer system (2500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2510), data-glove (not shown), or joystick (2505), but there can also be tactile feedback devices that do not serve as input devices), audio output devices (such as: speakers (2509), headphones (not depicted)), visual output devices (such as screens (2510) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2500) can also include human accessible storage devices and their associated media such as optical media including CD/DVD ROM/RW (2520) with CD/DVD or the like media (2521), thumb-drive (2522), removable hard drive or solid state drive (2523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2500) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2549) (such as, for example USB ports of the computer system (2500)); others are commonly integrated into the core of the computer system (2500) by attachment to a system bus as described below (for example Ethernet interface into a PC computer system or cellular network interface into a smartphone computer system). Using any of these networks, computer system (2500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2540) of the computer system (2500).

The core (2540) can include one or more Central Processing Units (CPU) (2541), Graphics Processing Units (GPU) (2542), specialized programmable processing units in the form of Field Programmable Gate Areas (FPGA) (2543), hardware accelerators for certain tasks (2544), and so forth. These devices, along with Read-only memory (ROM) (2545), Random-access memory (2546), internal mass storage such as internal non-user accessible hard drives, SSDs, and the like (2547), may be connected through a system bus (2548). In some computer systems, the system bus (2548) can be accessible in the form of one or more physical plugs to enable extensions by additional CPUs, GPU, and the like. The peripheral devices can be attached either directly to the core's system bus (2548), or through a peripheral bus (2549). Architectures for a peripheral bus include PCI, USB, and the like.

CPUs (2541), GPUs (2542), FPGAs (2543), and accelerators (2544) can execute certain instructions that, in combination, can make up the aforementioned computer code. That computer code can be stored in ROM (2545) or RAM (2546). Transitional data can be also be stored in RAM (2546), whereas permanent data can be stored for example, in the internal mass storage (2547). Fast storage and retrieve to any of the memory devices can be enabled through the use of cache memory, that can be closely associated with one or more CPU (2541), GPU (2542), mass storage (2547), ROM (2545), RAM (2546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2500), and specifically the core (2540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2540) that are of non-transitory nature, such as core-internal mass storage (2547) or ROM (2545). The software implementing various embodiments of the present disclosure can be stored in such devices and executed by core (2540). A computer-readable medium can include one or more memory devices or chips, according to particular needs. The software can cause the core (2540) and specifically the processors therein (including CPU, GPU, FPGA, and the like) to execute particular processes or particular parts of particular processes described herein, including defining data structures stored in RAM (2546) and modifying such data structures according to the processes defined by the software. In addition or as an alternative, the computer system can provide functionality as a result of logic hardwired or otherwise embodied in a circuit (for example: accelerator (2544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

Appendix A: Acronyms
MV: Motion Vector
HEVC: High Efficiency Video Coding
SEI: Supplementary Enhancement Information
VUI: Video Usability Information GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit

What is claimed is:

1. A method for video coding by a decoder, comprising:
reconstructing one or more blocks neighboring a first block that is rectangular but non-square;
determining a range of reference samples for an intra prediction of the first block based on dimensions of the first block, wherein the range includes samples having coordinates of x=[−1], y=[−1 to Y], and x=[0 to X], y=[−1], Y being based on a length of a first side of the first block and an integer m, X being based on a length of a second side of the first block that is perpendicular to the first side of the first block and an integer n, and the integers m and n being greater than or equal to 0;
padding a sample buffer based on the determined range of the reference samples; and
performing the intra prediction of the first block based on the reference samples in the determined range.

2. The method of claim 1, wherein when at least one of the reference samples for the intra prediction of the first block is not available, the intra prediction of the first block is performed based on at least one of the reference samples determined to be available and a substitute reference sample generated based on at least one sample of the reconstructed one or more blocks.

3. The method of claim 1, wherein when all of the reference samples for the intra prediction of the first block in the determined range are not available in the one or more blocks neighboring the first block, the intra prediction of the first block is performed based on a nominal average sample value.

4. The method of claim 1, wherein the length of the first side of the first block is a height of the first block and the length of the second side of the first block is a width of the first block.

5. The method of claim 1, wherein a value of m or n is dependent on a size of the first block indicated by a width, a height, or a width/height ratio of the first block.

6. The method of claim 1, wherein m is smaller than n when a width of the first block is larger than a height of the first block.

7. The method of claim 1, wherein m is larger than n when a width of the first block is less than a height of the first block.

8. The method of claim 1, wherein n is equal to 0 when a width of the first block is larger than a height of the first block, and a width/height ratio of the first block is equal to or less than 2.

9. The method of claim 1, wherein m is equal to 0 when a width of the first block is smaller than a height of the first block, and a width/height ratio of the first block is equal to or larger than 1/2.

10. The method of claim 1, wherein n is greater than 10 when a width/height ratio of the first block is larger than 2.

11. The method of claim 10, wherein n ranges from 10 to 15 when the width/height ratio of the first block is larger than 2.

12. The method of claim 1, wherein m is greater than 10 when a height/width ratio of the first block is larger than 2.

13. The method of claim 12, wherein m ranges from 10 to 15 when the height/width ratio of the first block is larger than 2.

14. The method of claim 1, wherein n is greater than 10 when a width of the first block is larger than a height of the first block.

15. The method of claim 14, wherein n ranges from 10 to 15 when the width of the first block is larger than the height of the first block.

16. The method of claim 1, wherein m is greater than 10 when a height of the first block is larger than a width of the first block.

17. The method of claim 16, wherein m is in a range of 10 to 15 when the height of the first block is larger than the width of the first block.

18. An apparatus for video coding, comprising circuitry configured to:
reconstruct one or more blocks neighboring a first block that is rectangular but non-square;
determine a range of reference samples for an intra prediction of the first block based on dimensions of the first block, wherein the range includes samples having coordinates of x=[−1], y=[−1 to Y], and x=[0 to X], y=[−1], Y being based on a length of a first side of the first block and an integer m, X being based on a length of a second side of the first block that is perpendicular to the first side of the first block and an integer n, and the integers m and n being greater than or equal to 0;
pad a sample buffer based on the determined range of the reference samples; and
perform the intra prediction of the first block based on the reference samples in the determined range.

19. The apparatus of claim 18, wherein the length of the first side of the first block is a height of the first block and the length of the second side of the first block is a width of the first block.

20. A non-transitory computer-readable medium, storing instructions that, when executed by a processor, causes the processor to perform:
reconstructing one or more blocks neighboring a first block that is rectangular but non-square;
determining a range of reference samples for an intra prediction of the first block based on dimensions of the first block, wherein the range includes samples having coordinates of x=[−1], y=[−1 to Y], and x=[0 to X], y=[−1], Y being based on a length of a first side of the first block and an integer m, X being based on a length of a second side of the first block that is perpendicular to the first side of the first block and an integer n, and the integers m and n being greater than or equal to 0;

padding a sample buffer based on the determined range of the reference samples; and performing the intra prediction of the first block based on the reference samples in the determined range.

\* \* \* \* \*